United States Patent
Deeb et al.

[19]

[11] Patent Number: 6,048,806

[45] Date of Patent: Apr. 11, 2000

[54] ADHESIVE TAPE AND METHOD OF MAKING

[75] Inventors: Gerald S. Deeb, Mendota Heights, Minn.; Dennis L. Krueger; Robert H. Menzies, both of Hudson, Wis.; Herbert W. Morris, St. Paul; Patrick D. Hyde, Burnsville, both of Minn.; Felix P. Lau, Austin, Tex.; Eumi Pyun, Austin, Tex.; Pamela S. Tucker, Austin, Tex.; Roy Wong, White Bear Lake, Minn.

[73] Assignee: 3M Innovative Properties Company, St. Paul, Minn.

[21] Appl. No.: 08/951,927

[22] Filed: Oct. 16, 1997

Related U.S. Application Data

[62] Division of application No. 08/577,855, Dec. 22, 1995, Pat. No. 5,795,834.

[51] Int. Cl.[7] ............................. B32B 7/12; B32B 27/12
[52] U.S. Cl. ......................... 442/151; 442/62; 428/343; 428/354; 428/355 AC
[58] Field of Search ................................. 442/37, 45, 62, 442/151, 149; 428/343, 353, 354, 355 AC, 356

[56] References Cited

U.S. PATENT DOCUMENTS

| Re. 24,906 | 12/1960 | Ulrich ........................................ 206/59 |
| 2,187,563 | 1/1940 | Thomas . |
| 2,352,463 | 6/1944 | Wenzelberger et al. . |
| 2,415,276 | 2/1947 | Buckley et al. . |
| 2,487,060 | 11/1949 | Pike et al. . |

(List continued on next page.)

FOREIGN PATENT DOCUMENTS

| 0 312 228 | 4/1989 | European Pat. Off. . |
| 0 336 727 | 10/1989 | European Pat. Off. . |
| 0 352 901 | 1/1990 | European Pat. Off. . |
| 0 457 566 | 11/1991 | European Pat. Off. . |
| 2 241 829 | 3/1974 | Germany . |

(List continued on next page.)

OTHER PUBLICATIONS

"Standard Methods of Test for Resistance of Paper to Passage of Air," ASTM, pp. 180–186, 1971.
Gaska Tape Product Profile, Gaska Tape, Inc., before Dec. 22, 1995.
Flormel Adhesive Products, Product Brochure, before Dec. 22, 1995.
Carolina Narrow Fabric Co., "Series of Woven Glass Tapes," Product Brochure, before Dec. 22, 1995.
Avery Dennison, Avery Specialty Tape Division, Product Information Bulletin, before Dec. 22, 1995.
Anchor Continental Inc. Product Brochure, before Dec. 22, 1995.
Adhesives Research, Inc. Product Brochure, 1991.
RSW Inc. Specialty Tapes Division Product Brochure, before Dec. 22, 1995.
Nitto Denko Co., Tape Product Brochure, before Dec. 22, 1995.
MC Master–Carr Supply Co., Duct Tape Product Brochure, before Dec. 22, 1995.
Koch Protective Treatments, Inc. Parr Tape Product Brochure, before Dec. 22, 1995.
Kimberly–Clark Corp.,/Brown–Bridge Industrial Products, Product Brochure, before Dec. 22, 1995.

*Primary Examiner*—Daniel Zirker
*Attorney, Agent, or Firm*—Carolyn V. Peters

[57] ABSTRACT

An adhesive tape is provided which comprises a woven cloth, a polymer embedded into the cloth so as to cause the warp and weft fibers of the cloth to bond together at their overlapping points but not to completely encase the fibers, and a pressure sensitive adhesive coated onto at least a portion of the polymer, wherein the adhesive tape is hand tearable in the down-web and in the cross-web direction. A method of manufacturing such a tape is also provided.

26 Claims, 5 Drawing Sheets

U.S. PATENT DOCUMENTS

| | | | |
|---|---|---|---|
| 2,884,342 | 4/1959 | Wolff . | |
| 3,246,049 | 4/1966 | Webber | 260/826 |
| 3,437,622 | 4/1969 | Dahl | 260/24 |
| 3,441,430 | 4/1969 | Peterson | 260/29.6 |
| 3,552,994 | 1/1971 | Dipner . | |
| 3,616,146 | 10/1971 | Gabet | 117/68 |
| 3,853,598 | 12/1974 | Raguse | 117/122 |
| 3,890,407 | 6/1975 | Briggs, Jr. et al. | 260/878 |
| 3,956,056 | 5/1976 | Boguslawski et al. | 156/244 |
| 3,975,463 | 8/1976 | Hirata et al. | 260/897 |
| 4,077,926 | 3/1978 | Sanderson et al. | 260/844 |
| 4,082,705 | 4/1978 | Beede et al. | 260/4 |
| 4,107,233 | 8/1978 | Hansen | 260/876 |
| 4,243,500 | 1/1981 | Glennon | 204/159.12 |
| 4,288,358 | 9/1981 | Trotter et al. | 260/31.8 |
| 4,388,349 | 6/1983 | Korpman et al. | 427/208.4 |
| 4,410,482 | 10/1983 | Subramanian | 264/515 |
| 4,438,232 | 3/1984 | Lee | 524/272 |
| 4,439,482 | 3/1984 | Suematsu | 428/343 |
| 4,444,817 | 4/1984 | Subramanian | 428/36 |
| 4,545,843 | 10/1985 | Bray | 427/207.1 |
| 4,554,324 | 11/1985 | Husman et al. | 525/301 |
| 4,619,979 | 10/1986 | Kotnour et al. | 526/88 |
| 4,699,842 | 10/1987 | Jorgensen et al. | 428/343 |
| 4,732,808 | 3/1988 | Krampe et al. | 428/355 |
| 4,740,416 | 4/1988 | DeCoste, Jr. et al. | 428/240 |
| 4,749,612 | 6/1988 | Borkowski et al. | 428/244 |
| 4,810,523 | 3/1989 | Williams et al. | 427/36 |
| 4,833,179 | 5/1989 | Young et al. | 522/183 |
| 4,835,217 | 5/1989 | Jorgensen et al. | 525/93 |
| 4,912,169 | 3/1990 | Whitmire et al. | 525/221 |
| 4,952,650 | 8/1990 | Young et al. | 526/194 |
| 4,992,331 | 2/1991 | DeCoste, Jr. | 428/353 |
| 4,994,267 | 2/1991 | Sablotsky | 428/484 |
| 5,108,815 | 4/1992 | Adams et al. | 428/156 |
| 5,143,972 | 9/1992 | Groves | 525/71 |
| 5,162,150 | 11/1992 | Buis et al. | 428/247 |
| 5,198,064 | 3/1993 | Tani et al. | 428/207 |
| 5,202,361 | 4/1993 | Zimmerman et al. | 522/120 |
| 5,206,288 | 4/1993 | Gosiewski et al. | 525/83 |
| 5,209,971 | 5/1993 | Babu et al. | 428/343 |
| 5,229,206 | 7/1993 | Groves | 428/344 |
| 5,230,701 | 7/1993 | Meyer et al. | 602/76 |
| 5,246,773 | 9/1993 | Mamish | 428/343 |
| 5,257,491 | 11/1993 | Rouyer et al. | 53/428 |
| 5,264,281 | 11/1993 | Arakawa et al. | 428/343 |
| 5,266,399 | 11/1993 | Babu et al. | 428/343 |
| 5,284,889 | 2/1994 | Pyun et al. | 824/94 |
| 5,286,781 | 2/1994 | Gotoh et al. | 524/505 |
| 5,290,842 | 3/1994 | Sasaki et al. | 524/271 |
| 5,296,561 | 3/1994 | Babu et al. | 525/342 |
| 5,300,291 | 4/1994 | Sablotsky et al. | 424/78 |
| 5,308,695 | 5/1994 | Arakawa et al. | 428/343 |
| 5,368,927 | 11/1994 | Lesca et al. | 428/288 |
| 5,382,451 | 1/1995 | Johnson et al. | 427/208.4 |
| 5,382,461 | 1/1995 | Wu | 156/160 |
| 5,385,783 | 1/1995 | Patel et al. | 428/153 |
| 5,496,603 | 3/1996 | Riedel et al. | 442/151 X |
| 5,496,605 | 3/1996 | Augst et al. | 428/343 X |
| 5,545,472 | 8/1996 | Koubek et al. | 428/261 |
| 5,547,766 | 8/1996 | Gobran . | |
| 5,795,834 | 8/1998 | Deeb et al. | 442/62 |

FOREIGN PATENT DOCUMENTS

| | | |
|---|---|---|
| 60-226579 | 11/1985 | Japan . |
| 2-2206671 | 8/1990 | Japan . |
| 4-18344 | 1/1992 | Japan . |
| 5-98223 | 4/1993 | Japan . |
| 05247422 | 1/1994 | Japan . |
| 07003235 | 1/1995 | Japan . |
| 1 230 097 | 4/1971 | United Kingdom . |
| WO 93/07228 | 4/1993 | WIPO . |
| WO 93/20165 | 10/1993 | WIPO . |
| WO 93/23224 | 11/1993 | WIPO . |
| WO 94/24221 | 10/1994 | WIPO . |

ADHESIVE TAPE AND METHOD OF MAKING

This application is a division of application Ser. No. 08/577,855 filed Dec. 22, 1995 which application is now U.S. Pat. No. 5,795,834.

Related patent applications entitled Pressure-Sensitive Adhesive, Ser. No. 08/578,010; Pressure-Sensitive Adhesive, Ser. No. 08/577,603; and Pressure-Sensitive Adhesive Suitable for Skin and Method of Preparing, Ser. No. 08/577,923; all assigned to 3M Company and filed on the same day as this application are incorporated herein by reference.

FIELD OF THE INVENTION

The invention relates to adhesive tapes with woven backings. More particularly the invention relates to woven adhesive tapes that are well-suited for medical uses and are hand tearable in the cross-web and in the web direction.

BACKGROUND

Cloth or cloth-like tapes are useful in numerous applications. For example, cloth-like tapes are used in medical applications where they typically are adhered to skin. Most of the uses of cloth adhesive tapes in the medical market are for securing medical devices and light immobilization support. Some typical applications include securing endotracheal tubes, nasogastric tubes, and chest tubes, stabilizing body splints, and anchoring bulky wound dressings. Because these applications usually include,contacting skin, one important desire for the tape is that the adhesive adhere in moist or oily environments. Other characteristics often desired in cloth-like adhesive tapes ("woven tapes") include a high tensile strength in the down and cross-web directions and ease of tearing by hand in both the down and cross-web directions along a substantially straight line without fraying. Cloth or cloth-like tapes are also used in industrial and commercial applications such as in duct tapes, strapping tapes, electrical tapes, general utility tapes and in abrasives to name a few.

Medical cloth tapes that are currently available are generally manufactured using a densely woven cotton or synthetic cloth. As the weave density of the cloth used to manufacture adhesive tape increases, the strength of the resulting tape typically increases for the same size fiber. Likewise, as the weave density of the cloth increases it is easier to hand tear the resulting tape in a straight line. Medical cloth-like tapes that are currently available typically comprise a woven cloth backing coated with a rubber based adhesive. Although the quality of the cloth varies, a dense weave cotton is commonly used which provides adequate strength and allows tearing along a straight line. Natural rubber based adhesives are usually solvent coated and/or calendered onto the backing and exhibit good adhesion to skin but can cause allergic reactions such as rashes. Several companies manufacture cloth-like adhesive tapes for medical uses. These tapes include Johnson & Johnson's Zonas Porous®, Kendall's Curity Porous®, and Beiersdorf's Leukotape®. Each of these tapes consist of densely woven cotton cloths completely coated or pattern coated with rubber based adhesives.

U.S. Pat. No. 2,352,463 to Wenzelberger et al. teaches interposing a flexible barrier sheet or bafle between the fabric and the adhesive to prevent the adhesive from substantially striking through the fabric of the tape. Wenzelberger et al. teach that this saves adhesive mass and avoids messy conditions as well as promoting the elasticity of the fabric without substantially increasing its weight. The Wenzelberger tape is prepared by knife spreading the elastic or pliable barrier sheet or film. The backing fabric of Wenzelberger may be a relatively closely woven material, a coarse woven material or any conventional flexible material.

U.S. Pat. No. 4,545,843 to Bray discloses an adhesive tape which is manufactured by laminating at least one layer of heat activated adhesive film to one layer of a substrate material, and coating the thereby obtained laminate with a pressure sensitive adhesive. The film is specifically a random copolymer of ethylene and acrylic acid. The adhesive which is coated on the laminate cannot flow through the substrate, even if a porous substrate is used.

U.S. Pat. No. 3,853,598 to Raguse discloses an adhesive tape comprised of a high thread count woven synthetic fabric, an acrylic latex primer which is either solvent-based or water-based, and an adhesive coated on the primer side of the fabric. The primer bonds the warp and weft threads together to produce a single sheet of material which may easily be torn straight in either direction.

U.S. Pat. No. 3,616,146 to Gabet discloses preglued wall textiles which are comprised of woven or nonwoven fabric which has been made hydrophobic, a continuous impermeable plastic resinous film adhered to one face of the fabric to minimize stretch and fraying, and a layer of dry nontacky liquid-sofienable adhesive coated on the exposed surface of the film.

U.S. Pat. No. 2,487,060 to Pike et al. discloses a barrier coat for adhesive sheets. The barrier coat is a synthetic rubber which provides a uniform surface to prevent penetration of the adhesive into the porous backing. The barrier coat is either coated from solvent or calendered onto the porous backing.

U.S. Pat. No. 2,415,276 to Buckley et al. discloses a flexible woven fabric backing with a laver of adhesive and an intermediate coating composed of suitable rubber compositions which when vulcanized serve to prevent the adhesive from passing into the fabric's interstices. The intermediate coating is either calendered onto the surface of the fabric or dispersed into a suitable solvent and then the solution is spread evenly on the surface of the fabric backing. The Buckley et al. specification teaches at column 2 lines 24–29 that while the intermediate film adheres to the surface of the fabric it does not enter the interstices of the fabric.

U.S. Pat. No. 2,187,563 to Thomas discloses an adhesive tape which is prepared by impregnating a woven fabric with wax-aluminum acetate-deacetylated chitin composition, drying, and thereafter anchoring on one side a rubber based pressure sensitive adhesive. U.S. Pat. No. 2,884,342 to Wolff teaches a pressure sensitive adhesive sheet material which is comprised of a fabric backing impregnated with a mixture of resinous materials and has a layer of adhesive material applied to one side. Impregnating results in woven fibers that are encased in a composition.

The art does not provide a tape which is both inexpensive to manufacture and exhibits the properties of a cloth-like adhesive tape. These properties include a feel of cloth, the ability to be torn in a straight line without exerting undue force and without excessive fraying occurring.

SUMMARY

The invention provides an adhesive tape which is inexpensive to manufacture, is hand tearable in the cross-web and down-web directions in a substantially straight line without fraying and exhibits tensile strength suitable for medical, industrial and commercial applications. Further, the invention tape provides an adhesive tape that has the feel of cloth because the individual cloth fibers are not encased in either an adhesive or a polymer composition. The invention tape is comprised of a cloth-like substrate, a polymer embedded into the cloth but not encasing the fibers of the cloth and a pressure sensitive adhesive coated onto the polymer. A method of manufacturing the tape of the invention is also included.

An adhesive tape is provided comprising a woven cloth, a polymer exusion coated and embedded into the cloth and capable of adhering to the cloth, and a pressure sensitive adhesive coated onto at least a portion of the polymer, wherein the adhesive tape is hand tearable in a substantially straight line without fraying. The adhesive tape has a cloth feel on the uncoated side. The polymer is selected from the group of polyethylene elastomer, copolymers of polyethylene, blends of polyethylene and polyethylene copolymer, ethylene vinyl acetate, polyurethane, block copolymers, polyether block amides, acrylonitrile butadiene styrene copolymer, polyester block copolymers, polypropylene, polycarbonate, polyacrylics, nylon and blends thereof An adhesive tape is provided which is comprised of a polyethylene-based polymer embedded into a woven cloth with an adhesive comprised of a blend of an acrmlic and a thermoplastic elastomer coated on the polymer wherein the unwind tension of a roll of tape is less than 14N/dm without using a low adhesion backsize. When torn by hand, the edges of such an adhesive tape do not curl or fray.

An adhesive tape is provided which comprises a woven cloth, a polymer embedded into the cloth so as to cause the down-web and cross-web fibers of the cloth to bond together at their overlapping points but not to completely encase the fibers, and a pressure sensitive adhesive coated onto at least a portion of the polymer, wherein the adhesive tape is hand tearable in a substantially straight line without fraying. The adhesive composition is preferably comprised of a blend of an acrylic pressure-sensitive adhesive and a thermoplastic elastomer. The adhesive composition comprises at least 5 weight percent adhesive and the composition has a morphology comprising at least two distinct domains, a first domain being substantially continuous in nature and a second domain being fibrillose to schistose in nature parallel to the major surface of the adhesive within said first domain. Optionally, the adhesive is comprised of a blend of an acrylic pressure-sensitive adhesive and an elastomer and a tackifier, the composition comprising at least 5 weight percent adhesive and the composition having a morphology comprising at least two distinct domains, a first domain being substantially continuous in nature and the second domain being fibrillose to schistose in nature parallel to the major surface of the adhesive within the first domain.

A method of making an adhesive tape is also provided. The method comprises the steps of (a) providing a woven cloth substrate having a first side and a second side, (b) applying a polymer onto the first side of the substrate at a temperature, rate and amount to cause the fibers of the substrate to bind without causing the polymer to completely encase the fibers of the cloth, and (c) coating a pressure sensitive adhesive onto the polymer side of the polymer coated substrate wherein the resulting adhesive tape is hand tearable in a substantially straight line without fraying.

An adhesive tape is provided which comprises a substrate comprised of regularly spaced fibers in the down-web and cross-web directions wherein the fibers are not woven, a polymer applied and partially embedded into the substrate such that the down-web and cross-web fibers are not completely encased by the polymer, and a pressure sensitive adhesive coated onto at least a portion of the polymer, wherein the adhesive tape is hand tearable along a substantially straight line without fraying.

A composite backing is also provided, the backing comprising a substrate having a first side and a second side, a polymer on the second side of the substrate and the polymer embedded into the substrate such that the overlapping fibers of the substrate are bound together but the polymer does not extend through to the first side of the substrate, and wherein the resulting composite backing is hand tearable along a substantially straight line without fraying.

DEFINITIONS

Figure 1:
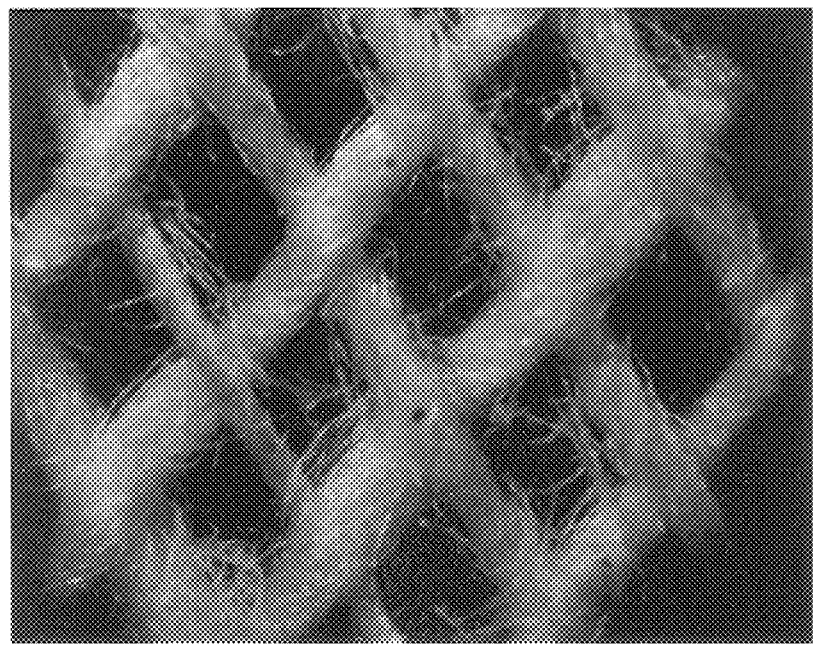
FIG. 1 is a 50 times magnification light micrograph of a woven cloth for use in the invention.

"Cross-web" as used herein refers to the direction on a cloth or web which is perpendicular to the down-web direction.

"Delamination" as used herein refers to the polymer lifting and peeling away from the cloth on a polymer/cloth composite backing.

"Down-web" as used herein refers to the direction that a cloth or web is manufactured, the term is synonymous with "machine direction" or "web direction."

"Extruding" as used herein refers to the process of placing a molten material on a web to obtain a composite material.

"Laminate" as used herein refers to the process and the product resulting from combining an existing film and a web in the presence of heat.

"Low adhesion backsize" as used herein refers to any material applied to a tape backing to reduce the adhesion of the pressure sensitive adhesive to the backing when unwinding a roll of tape.

"Pressure sensitive adhesive" as used herein refers to materials which adhere to a substrate with no more than applied finger pressure and are aggressively and permanently tacky.

"Substrate" as used herein refers to a material having regularly spaced substantially parallel fibers in the down-web and cross-web direction and the fibers may or may not be interlaced in a weave.

"Woven" as used herein refers to strips, strands or fibers of material that are interlaced to form a cloth. The fibers are substantially parallel in the warp direction and substantially parallel in the weft direction.

DETAILED DESCRIPTION OF PREFERRED EMBODIMENTS

The cloth-like adhesive tape of the invention is comprised of at least three components. These include (1) a woven cloth or substrate, (2) a polymer, and (3) a pressure sensitive adhesive. Each of these components is described below along with a description of the necessary order of the components and the physical characteristics of the resulting adhesive tape.

Woven Cloth/Substrate

A woven cloth of synthetic or natural fiber is useful in the present invention. If a substantially straight tear line is desired it is important that a nonwoven randomly oriented fiber web is not used. If a woven cloth is used, the perpendicular weave of the warp and weft threads provide straight lines along which a propagated tear may continue. Alternatively a regularly spaced fibrous substrate may be used in the invention. The substantially parallel down-web and cross-web threads of the substrate provide straight lines along which the invention tape can be torn. An example of such a substrate is CLAF® fabric as available from Amoco/Nisseki CLAF Inc. of Atlanta, Ga. It is desirable that the tape of the invention is easily torn along a straight line since straight line tears result in less waste and result in tapes that are easier to use than tapes that tear raggedly.

Any density weave of cloth is useful in the tape of the invention. Looser weave cloth generally permits lower costs and greater conformability. Tighter weave cloth permits easier tear and higher tensile properties for the same size fibers. Generally, as the weave density increases the cost of the cloth also increases. However, high density cloths are usually easier to tear than low density cloths. As the weave density of the cloth decreases, the cost of the cloth also decreases and the ability to tear the cloth in a straight line decreases. As one will recognize, in order to reduce manufacturing costs it is desirable to use a low density weave cloth for cloth tapes since the raw material costs are reduced. The invention allows this without compromising tearability of the tape.

Weave densities in the range of 5 warp threads per 2.5 cm (1 inch) by 5 weft threads per 2.5 cm (1 inch) to 300 by 300 are useful in the present invention. Generally, a looser weave is used to prepare constructions that require increased conformability or decreased cost. Tighter weave substrates are used in constructions that require a high tensile strength. In addition, unbalanced weave constructions are useful when particular performance properties are desired in one direction. The performance properties are not necessarily in the perpendicular direction. For example, the greatest cross-web and down-web elongation occurs when the fiber orientation is rotated 45 degrees. One skilled in the art will recognize that it is necessary to assess the desired performance of the resulting tape when selecting the density of the woven cloth. If drape is important a lower density weave is chosen, however, a lower density weave may require a thicker polymer layer if excellent tear properties are required. This is described more fully below. Therefore, the performance of the resulting tape is dependent upon several parameters, one of which includes the weave density of the woven cloth.

The composition of the fibers of the woven cloth or of the substrate is either natural or synthetic or a combination thereof. Examples of natural fibers include cotton, silk hemp and flax. Examples of synthetic fibers include rayon, polyester, acrylic, acrylate, polyolefin, nylon and glass. As with weave density, the choice of fibers which comprise the woven cloth chosen to make the tape of the invention is dependent upon the cost, the desired feel or hand, drape, tensile strength, tearability and general performance of the resulting tape. Woven cloths comprised of synthetic fibers are generally less expensive than those comprised of natural fibers. However, the desired feel of a tape manufactured from a natural fiber woven cloth may outweigh the cost considerations when choosing the fiber content of the woven cloth. One feature of the invention is that the fibers of the substrate are not completely saturated with or encased in the polymer which is described in more detail below. Thus, for example, if the tapes of the invention are comprised of a woven cloth, the tapes maintain the feel of the woven cloth even though they also include a polymer in their construction. One skilled in the art will recognize the desired properties of a tape and will choose the fiber content of the woven cloth or substrate to correlate with these properties.

Polymer

A polymer is applied to a woven cloth or substrate. The polymer is heat processable which allows one to apply the polymer onto the cloth or substrate via methods such as, for example, extrusion, lamination, or hot melt coating. Additionally, the polymer can be elastomeric which allows any resulting tape to stretch across the bias of the woven cloth. Stretchability is desirable if the resultant tape is used for medical purposes since a tape which can stretch across the bias will improve a patient's comfort by allowing the tape to extend slightly as a result of the patient's movements. Polymers useful in the invention are those which are melt processable and include thermoplastics, thermoplastic elastomers, and elastomers and blends thereof. Examples of thermoplastics include but are not limited to polyolefins such as ENGAGE™ 8200 available from Dow Chemical Co., ATTANE™ available from Dow Chemical Co., FLEXOMER™ 1137 and 1138 from Union Carbide, Linear-Low Density Polyethylene 6806, available from Dow Chemical Co., Midland, Mich.; acrylonitrile-butadiene-styrene such as CYCOLAC™ DFA 1000R, available from General Electric, Pittfield, Mass.; nylon such as ZYTEL™ 159L, available from DuPont; polycarbonate such as LEXAN™ 101 available from General Electric Plastics; polyvinyl chloride such as TEMPRITE™ 88203, available from BF Goodrich; and ethylene vinylacetate such as ELVAX™ 240 and 40W; available from DuPont and ESCORENE™ LD312.09 from Exxon. Examples of thermoplastic elastomers include but are not limited to linear, radial, star and tapered styrene-isoprene block copolymers such as KRATON™ D1107P, available from Shell Chemical Co. and EUROPRENE™ SOL TE 9110, available from EniChem Elastomers Americas, Inc., linear styrene-(ethylene-butylene) block copolymers such as KRATON™ G1657, available from Shell Chemical Co., linear styrene-ethylene-propylene) block copolymers such as KRATON™ G1750X, available from Shell Chemical Co., linear, radial, and star styrene-butadiene block copolymers such as KRATON™ D1118X, available from Shell Chemical Co. and EUROPRENE™ SOL TE 6205, available from EniChem Elastomers Americas, Inc., and polyolefin elastomers based on metallocene catalysis such as ENGAGE™ EG8200, available from Dow Plastics Co. Examples of elastomers include but are not limited to natural rubbers such as CV-60, a controlled viscosity grade, and SMR-5, a ribbed smoked sheet rubber; butyl rubbers, such as Exxon Butyl 268 available from Exxon Chemical Co.; synthetic polyisoprenes such as CARIFLEX™, available from Royal Dutch Shell and NAT-SYN™ 2210, available from Goodyear Tire and Rubber Co.; ethylene-propylenes; polybutadienes; polyisobutylenes such as VISTANEX™ MM L-80, available from Exxon Chemical Co.; and styrene-butadiene random copolymer rubbers such as AMERIPOL™ 1011A, available from BF Goodrich One feature of the invention is that the tape is hand tearable along each of the fiber directions. Without being bound by theory it is believed that the tape of the invention is hand tearable in both directions because the polymer effectively links and bonds the warp and weft fibers together at the overlap points. However, as explained above it is also a feature of the invention that the invention tape retains the feel of cloth which requires that the cloth fibers are not encased. When choosing the polymer it is important that the polymer will not completely penetrate the woven cloth so that the fibers comprising the cloth or substrate do not get encased or do not get completely saturated.

Another feature of the invention is that the pressure sensitive adhesive cannot strike through the tape backing due to the construction of the backing. The polymer successfully prohibits the adhesive from penetrating the cloth or substrate. This feature is desirable for a few reasons. First, the tape is less messy because the adhesive is only present where the tape adheres to the substrate. Second, the tape is easier to unwind from a roll because the adhesive does not penetrate the cloth. Third, if the tape is a medical tape it is more comfortable for the patient if the adhesive does not penetrate the cloth and adhere to the patient's bedding or to the patient's clothing. Alternatively, the polymer can retard the migration of substances such as water into the pressure-sensitive adhesive.

The thickness of the polymer is dependent upon the desired properties of the tape and also on the weave density of the cloth or the fiber density of the substrate. The ease with which the tape is torn and the drape of the tape are correlated to both the weave density and to the polymer thickness. As earlier stated, a tape manufactured with a low density weave is traditionally more difficult to tear. However, as the low density weave cloth is coated with thicker polymer layers which readily bond the crossover points of the Warp and weft threads, the tape is easier to tear. A thicker polymer layer may decrease the drape of the tape and create a stiff tape but may increase the ease with which it is torn. On the other hand, a high density weave cloth bonded with a relatively thin polymer layer may result in a tape which is easy to tear and exhibits good drape. That is, the tape is not stiff. One must assess the desired properties and the cost of the tape to determine appropriate polymer thickness. Preferably the polymer thickness of the invention tape is in the range of about 12 and about 250 microns. Thinner polymer layers generally exhibit better drape and conformability characteristics than thicker polymer layers but usually also require a higher density cloth to retain tear properties. Tapes having constructions with thin polymer layers and high density woven cloth are useful as medical tapes. Tape construction using thicker polymer layers generally allows looser weave substrates or lower modulus polymeric materials to exhibit good tear properties. Such tape constructions are particularly suited for industrial applications where stiffness is desired such as in duct tape. In choosing the polymer thickness one must also consider the processing parameters. This is described below.

With proper selection of polymeric material, indentations form on the polymer side of the composite polymer/substrate construction which can result in voids when a pressure-sensitive adhesive layer is applied.

The invention anticipates that the polymer layer is comprised of either a single layer of polymer or is comprised of more than one layer of polymers having different properties. A multilayer polymer construction can be prepared as long as the properties described above are considered.

Fillers and dyes are optionally added to the polymer when other properties are also desired. Fillers may include colorants, plasticizers and antioxidants. For example, titanium oxide is added to the polymer if a white tape is desired. Any filler or dye may be added to the tape as long as it does not interfere with the polymer binding to the woven cloth.

Manufacturing the Polymer/Woven Cloth or Substrate Backing

The method of binding the woven cloth or substrate to the polymer to obtain the tape backing is important so that the tape of the invention is obtained. A suitable method of coating the polymer on the woven cloth or substrate is one which sufficiently embeds the polymer into the woven cloth causing the overlapping warp and weft threads to bond yet does not cause the polymer to completely penetrate and completely surround the fibers of the woven cloth. If the fibers of the woven cloth are impregnated or encased or both by the polymer, the backing no longer has many of the desirable properties of cloth, that is, it no longer has the drape or feel of cloth. Preparing the backing composite according to the invention results in the desired properties of the invention. It results in a tape which is hand tearable in both the cross-web and down-web directions without excessive fraying and also has the hand or feel of cloth on its uncoated surface.

A suitable method of coating the polymer on the substrate is one which sufficiently embeds the polymer into the substrate causing the overlapping warp and weft threads to bond more tenaciously than they are already bonded yet does not cause the polymer to completely penetrate and completely surround the fibers of the substrate. If the fibers of the substrate are impregnated or encased or both by the polymer, the backing becomes considerably more stiff. Preparing the backing composite according to the invention results in the desired properties of the invention. It results in a tape which is hand tearable in both the cross-web and down-web directions without excessive fraying and does not impregnate, saturate or completely encase the fibers.

Figure 2:
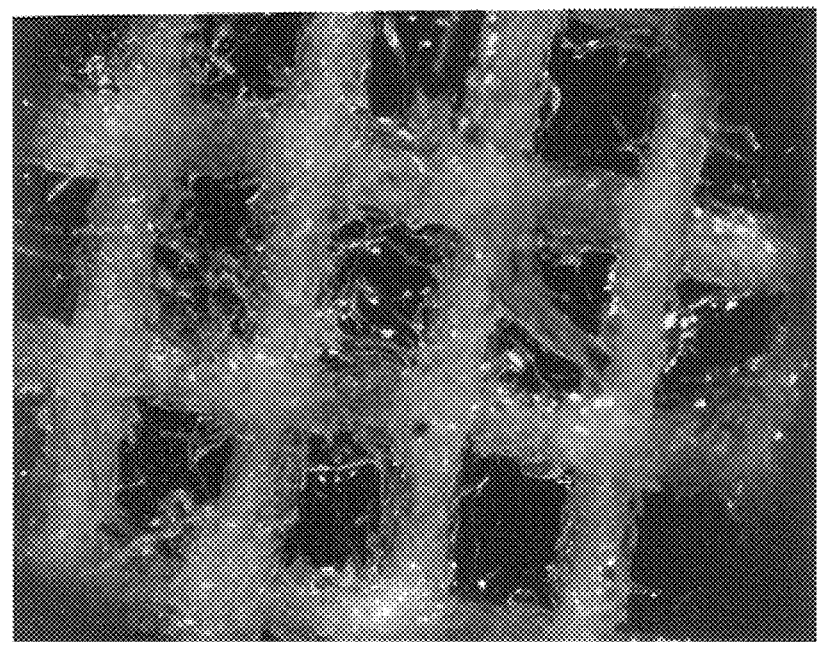
FIG. 2 is a 50 times magnification light micrograph of a comparative sample comprised of woven cloth solvent-coated with a polymer prepared by the method of Comparative Example 12.
Figure 3:
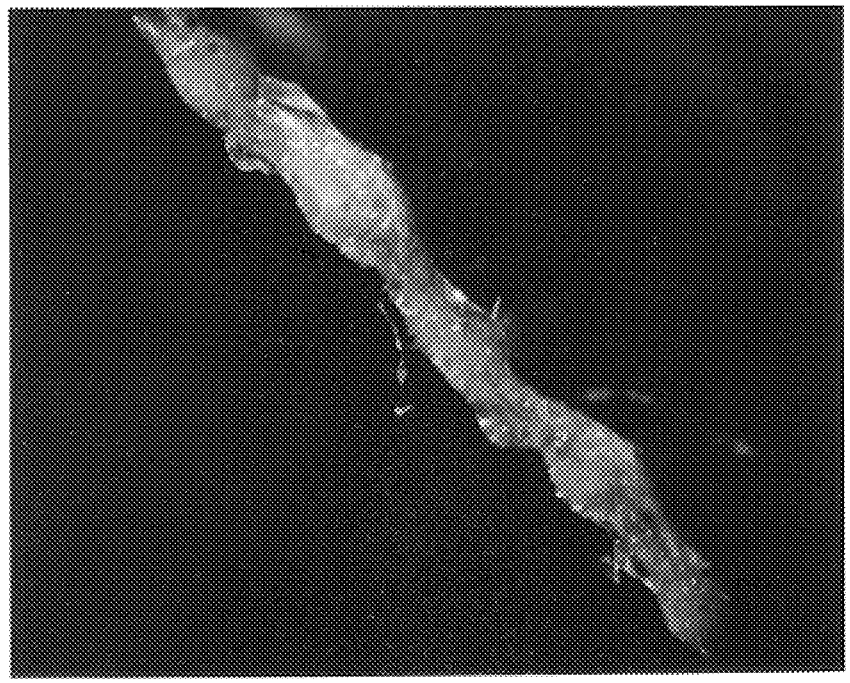
FIG. 3 is a cross-sectional view of the sample of FIG. 2.

Since the polymer does not encase the fibers of the woven cloth or substrate, the composite backing of the invention has two sides. One side is comprised of a substantially continuous polymer layer while the second side has the feel of cloth if a woven cloth is used. The Figures illustrate the distinctions between the invention and composite backings prepared by laminating a polymer to a cloth or saturating a cloth with a polymer. The methods of obtaining the samples shown in FIGS. 2, 3, 6 and 7 are described in detail in Comparative Examples 11 and 12 below. FIGS. 2 and 3 illustrate how the fibers of a woven cloth are completely surrounded with polymer if a solution coating or impregnating method is used to coat the cloth. As stated earlier, this method of coating results in a composite backing which does not have the feel of cloth, This backing is also considerably more stiff than the composite backings prepared by extruding the polymer onto the cloth. The samples in FIGS. 6 and 7 were prepared by laminating a polymer film onto the cloth. Although this method of preparation does not entirely encase the cloth fibers and provides a backing with the feel of cloth, it does not adequately bind the crossover points of the warp and weft threads. Tapes prepared by laminating a film to a cloth do not exhibit the same desirable tear properties as the invention tapes. That is, the lamninated tapes do not readily tear along a straight line without fraying and without requiring the exertion of considerable force.

Figure 4:
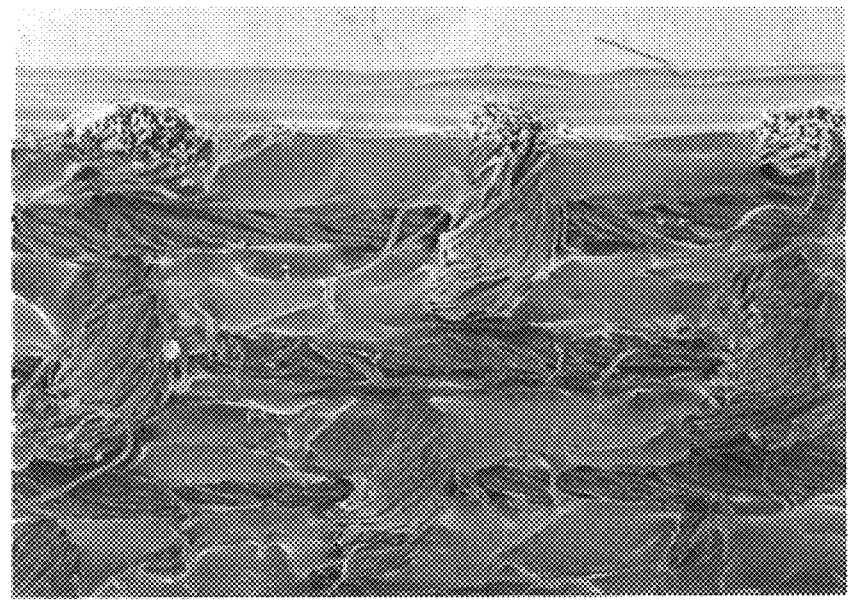
FIG. 4 is a 60 times magnification scanning electron micrograph (SEM) of a top view of a sample of the invention.
Figure 5:
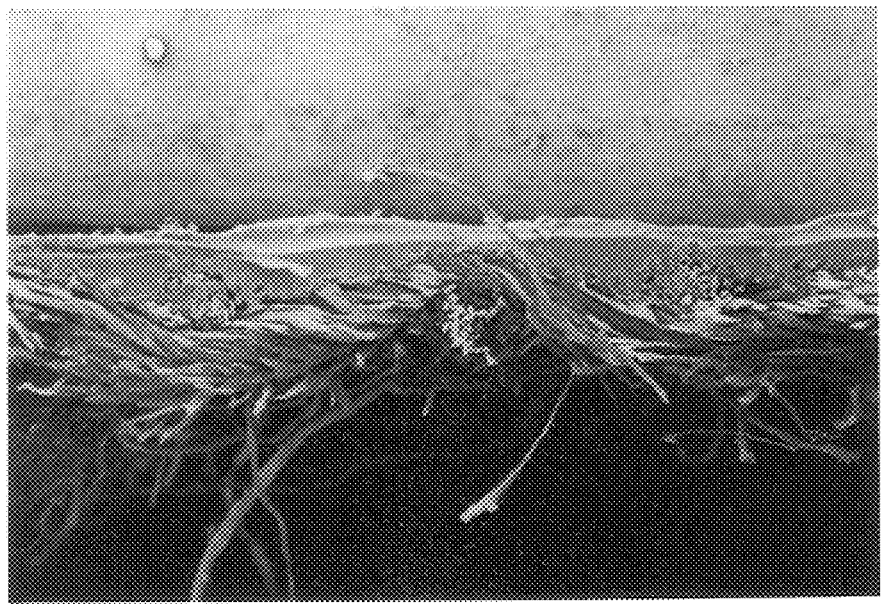
FIG. 5 is a 60 times magnification SEM of a cross-sectional view of the sample of FIG. 4.

Compare the samples of FIGS. 2, 3, 6 and 7 with the samples of the invention shown in FIGS. 4 and 5. The samples of FIGS. 4 and 5 were prepared by extruding a polymer onto a woven cloth according to the procedure described in Example 3 below. Polymer 18 is embedded into the fibers of the cloth 24 to provide adequate bonding of the crossover points 20 and 22. However, the cloth fibers 24 are not encased with the polymer providing a first cloth side and a second polymer side to the composite backing sample 26.

Preferably the polymer is extruded onto the woven cloth or substrate but other methods such as platen pressing a free film into the cloth or substrate are also acceptable. One drawback with the platen press method is that it is not continuous and would be an expensive method of manufacturing the invention. Any other method of coating the polymer onto the cloth or substrate is acceptable if the polymer is sufficiently embedded into the cloth or substrate so as to permanently weld the crossover points of the warp and weft fibers together.

In order to embed the polymer into the cloth without allowing the polymer to penetrate the cloth the processing parameters are carefully chosen. One skilled in the art recognizes that processing conditions are dependent upon the polymer used and the following temperature ranges are provided merely as a general guideline. If a polyethylene-olefin copolymer is used the polymer is preferably extruded at a temperature between 176° C. and 232° C., more preferably between 204° C. and 232° C., and most preferably between 204° C. and 218° C. The rate at which the polymer is extruded is another parameter which determines the depth to which the polymer is embedded into the woven cloth. If the polymer is not embedded deep enough into the woven cloth to bind the overlapping fibers of the cloth, the cloth/polymer composite may be placed through a calender to apply enough force to bind the cross-over portions of the warp and weft threads. If the post extrusion calendering is accomplished it is necessary that not too much force is applied so that the polymer does not penetrate or completely encase the fibers of the woven cloth.

Adhesive

A pressure sensitive adhesive is coated onto the polymer side of the composite backing to obtain the tape of the invention, Any pressure sensitive adhesive is usefull for preparing the tape of the invention. When choosing the appropriate pressure sensitive adhesive one must consider the intended use of the tape. For instance, if the tape is a medical tape the adhesive desirably has good initial adhesion, will tolerate the presence of moisture without releasing and the adhesion will not build substantially over time. Other applications such as industrial uses where a duct tape may adhere to steel or metal would require a different adhesive which is appropriate for the required performance of the tape. This adhesive may require good initial adhesion with a substantial increase in adhesion over time. Tolerance of the presence of moisture probably is not as critical for industrial tape adhesives as for adhesives used for medical applications.

Pressure sensitive adhesives require a delicate balance of viscous and elastic properties which result in a four-fold balance of adhesion, cohesion, stretchiness and elasticity. Pressure-sensitive adhesives generally comprise elastomers which are either inherently tacky, or elastomers or thermoplastic elastomers which are extended with the addition of tackifying resins and platicizing oils. They can be coated in solvent or as water-based emulsions to reduce the material viscosity to a level that is easily applied to the backing composite of the invention.

Major classes of pressure-sensitive adhesives useful for preparing the tape of the invention include but are not limited to natural rubbers; synthetic rubbers such as butyl rubber; and linear, radial, star, branched and tapered block copolymers such as styrene-butadiene, styrene-ethylene/butylene and styrene-isoprene; acrylics, especially those having long chain alkyl groups; and silicones.

One pressure sensitive adhesive suitable for use in the invention is comprised of a blend of about 5 to 95 weight percent of at least one acrylic pressure-sensitive adhesive and about 5 to 95 weight percent of at least one thermoplastic elastomeric material, the composition having a morphology comprising at least two distinct domains, a first domain being substantially continuous in nature and a second domain being fibrillose to schistose in nature parallel to the major surface of the adhesive composition within the first domain. The thermoplastic elastomeric material may optionally contain a tackifying resin or plasticizer, in which case it also may be an adhesive. This adhesive is prepared by (1) melt blending about 5 to 95 weight percent of at least one acrylic pressure-sensitive adhesive and about 5 to 95 weight percent of at least one thermoplastic elastomeric material, (2) forming the melt blended materials under shear or extensional conditions or both or forming and drawing the melt blend, to form an adhesive composition and extruding the adhesive composition onto the polymer side of the backing composite of the invention to form a pressure-sensitive adhesive tape, the adhesive having a morphology comprising at least two distinct domains, a first domain being substantially continuous in nature and the second domain being fibrillose to schistose in nature in the adhesive forming direction with the first domain. Further aspects of preparing such an adhesive are detailed in copending U.S. patent application Ser. No. 08/578,010 entitled, "Pressure-Sensitive Adhesive," filed on even date herewith, the text of which is incorporated by reference.

Alternatively the acrylic/thermoplastic elastomer blend is solvent blended, knife coated and oven dried in order to drive the solvent from the adhesive. Such a solvent blended, solvent coated adhesive blend does not exhibit the morphology described in the previous paragraph for the melt blended, extruded adhesive blends. One skilled in the art may choose the appropriate blending and coating techniques. An advantage with using the melt-blending and extruding method is that it is solvent-free meaning that it is more environmentally friendly than the solvent methods.

When preparing the acrylic/thermoplastic elastomer blend pressure sensitive adhesive, the following describes the acrylic pressure sensitive component used to prepare a suitable blend. Acrylic pressure-sensitive adhesives generally have a glass transition temperature of about −20° C. or less and may comprise from 100 to 80 weight percent of a $C_3$–$C_{12}$ alkyl ester component such as, for example, isooctyl acrylate, 2-ethyl-hexyl acrylate and n-butyl acrylate and from 0 to 20 weight percent of a polar component such as, for example, acrylic acid, methacrylic acid, ethylene vinyl acetate, N-vinyl pyrrolidone and styrene macromer. Preferably, the acrylic pressure-sensitive adhesives comprise from 0 to 20 weight percent of acrylic acid and from 100 to 80 weight percent of isooctyl acrylate. The acrylic pressure-sensitive adhesives may be self-tacky or tackified. Useful tackifiers for acrylics are rosin esters such as FORAL™ 85, available from Hercules, Inc., aromatic resins such as PICCOTEX™ LC-55WK, available from Hercules, Inc., and aliphatic resins such as ESCOREZ™ 1310LC, available from Exxon Chemical Co. Of course, such an acrylic adhesive is useful in the present invention alone or formed into a blended adhesive.

Thermoplastic elastomeric materials are materials which form at least two phases at 21° C., have a glass transition temperature greater than 50° C. and exhibit elastic properties in one of the phases. Thermoplastic elastomeric materials useful in the such a blend adhesive include, for example, linear, radial, star and tapered styrene-isoprene block copolymers such as KRATON™ D1107P, available from Shell Chemical Co. and EUROPRENE™ SOL TE 9110, available from EniChem Elastomers Americas, Inc., linear styrene-(ethylene-butylene) block copolymers such as KRATON™ G1657, available from Shell Chemical Co., linear styrene-ethylene-propylene) block copolymers such as KRATON™ G1750X, available from Shell Chemical Co., linear, radial, and star styrene-butadiene block copolymers such as KRATON™ D1118X, available from Shell Chemical Co. and EUROPRENE™ SOL TE 6205, available from EniChem Elastomers Americas, Inc., and polyolefin elastomers based on metallocene catalysis such as ENGAGE™ EG8200, available from Dow Plastics Co., and polyetherester elastomers such as HYTREL™ G3548, available from DuPont.

Another suitable adhesive for use in the present adhesive includes a pressure sensitive adhesive blend comprised of an acrylic pressure sensitive adhesive and an elastomer with a tackifier. The adhesive comprises about 5 to 95 percent by weight of an acrylic adhesive and about 5 to 95 percent of at least one elastomeric material with a tackifying rosin. As described above with reference to the thermoplastic elastomer/acrylic adhesive blends, the elastomer/acrylic adhesives may be prepared either by solvent blending or by melt blending. The resulting adhesive may be extruded to obtain an adhesive having morphology comprising at least two distinct domains, a first being substantially continuous in nature and the second being fibrillose to schistose in nature in the adhesive forming direction with the first domain. Elastomeric materials are materials which generally form one phase at 21° C., have a glass transition temperature less than 0° C. and exhibit elastic properties. Elastomeric materials useful for preparing such a blend adhesive include, for example, natural rubbers such as CV-60, a controlled viscosity grade, and SMR-5, a ribbed smoked sheet rubber; butyl rubbers, such as Exxon Butyl 268 available from Exxon Chemical Co.; synthetic polyisoprenes such as CARIFLEX™ IR309, available from Royal Dutch Shell and NATSYN™ 2210, available from Goodyear Tire and Rubber Co.; ethylene-propylenes; polybutadienes; polyisobutylenes such as VISTANEX™ MM L-80, available from Exxon Chemical Co.; and styrene-butadiene random copolymer rubbers such as AMERIPOL™ 1011A, available from BF Goodrich.

These elastomeric materials are modified with tackifying resins, liquid rubbers or plasticizers to lower their melt viscosity to facilitate the formation of line dispersions, with the smallest phase dimension preferably less than about 20 microns when blended with the acrylic pressure-sensitive adhesive. Tackifying resins or plasticizers useful with the elastomeric materials are preferably miscible at the molecular level, i.e., soluble in, any or all of the polymeric segments of the elastomeric material. The tackifying resins or plasticizers may or may not be miscible with the acrylic pressure-sensitive adhesive. The tackifying resin, when present, can generally comprise about 5 to 300 parts by weight, more typically about 50 parts to 200 parts by weight based on 100 parts by weight of the elastomeric material. The plasticizers, when present, can generally comprise about 5 to 400 parts by weight, typically up to 100 parts, more typically up to 30 parts by weight based on 100 parts by weight of the elastomeric material.

Specific examples of tackifiers useful for preparing an acrylic/elastomer blend adhesive include rosins such as FORAL™ 85, a stabilized rosin ester from Hercules, Inc., the SNOWTACK™ series of gum rosins from Tenneco, and the AQUATAC series of tall oil rosins from Arizona-Sylvachem; synthetic hydrocarbon resins such as ESCOREZ™ 1310LC aliphatic resin and ESCOREZ™ 2393 aliphatic/aromatic resin, both from Exxon Chemical Co. and WINGTACK™ 95 from Hercules, Inc.; terpene resins such as ZONAREZ™ M1115 from Arizona Chemical Co.; and liquid rubbers such as VISTANEX™ LMMH and VISTANEX™ LMMS, both from Exxon Chemical Co.

Natural rubber pressure-sensitive adhesives may also be used in the present invention. Natural rubber pressure-sensitive adhesives generally contain masticated natural rubber, from 25 parts to 300 parts of one or more tackifying resins to 100 parts of natural rubber, and typically from 0.5 to 2.0 parts of one or more antioxidants. The natural rubber may range in grade from a light pale crepe grade to a darker ribbed smoked sheet. Tackifying resins typically included in such an adhesive include wood rosin and its hydrogenated derivatives; terpene resins of various softening points, and petroleum-based resins, such as, the ESCOREZ™ 1300 series of C5 aliphatic olefin-derived resins from Exxon. Antioxidants are often used to retard the oxidative attack on the natural rubber that causes natural rubber pressure-sensitive adhesives to loss their cohesive strength. They include amines, such as N-N'-di-β-naphthyl-1,4-phenylenediamine, phenolics, such as 2,5-di-(tert amyl) hydroquinone, tetrakis[methylene 3-(3',5'-di-tert-butyl-4'-hydroxyphenyl)propionate]methane, available as IRGANOX™ 1010 from Ciba-Geigy Corp., and 2-2'-methylenebis(4-methyl-6-tert-butyl phenol), and dithiocarbamates, such as zinc dithiodibutyl carbamate. Other materials can be added for special purposes, including plasticizers, pigments, and curing agents to vulcanize the adhesive partially.

Synthetic rubber pressure-sensitive adhesives may also be used in the present invention. These aregenerally rubbery elastomers which are either self-tacky or require tackifiers, that can be used as either pressure-sensitive adhesives or as tackifiers and modifiers to other pressure-sensitive adhesives. The self-tacky synthetic rubber pressure-sensitive adhesives comprise either butyl rubber, a copolymer of isobutylene with less than 3 percent isoprene, polyisobutylene, a homopolymer of isoprene, polybutadiene, or styrene/butadiene rubber. Butyl rubber pressure-sensitive adhesives often contain from 0.5 to 2.0 parts per 100 parts butyl rubber pressure-sensitive adhesive of an antioxidant such as zinc dibutyl dithiocarbamate. Polyisobutylene pressure-sensitive adhesives do not usually contain antioxidants. The synthetic rubber pressure-sensitive adhesives, which generally require tackifiers, are also generally easier to process. They comprise polybutadiene or styrene/butadiene rubber, from 10 parts to 100 parts of a tackifier, and generally from 0.5 to 2.0 parts per 100 parts rubber of an antioxidant such as IRGANOX™ 1010. An example of a synthetic rubber is AMERIPOL™ 1011A, a styrene/butadiene rubber available from BF Goodrich. Tackifiers which are useful include derivatives of rosins such as FORAL™ 85, a stabilized rosin ester from Hercules, Inc., the SNOWTACK™ series of gum rosins from Tenneco, and the AQUATAC™ series of tall oil rosins from Arizona-Sylvachem; and synthetic hydrocarbon resins such as the PICCOLYTE™ A series, polyterpenes from Hercules, Inc., and the ESCOREZ™ 1300 series of C5 aliphatic olefin-derived resins. As with most adhesives, other materials can be added for special purposes, including hydrogenated butyl rubber, pigments, and curing agents to vulcanize the adhesive partially.

Yet another class of pressure sensitive adhesives useful for the present invention include block copolymer pressure sensitive adhesives which generally comprise elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer pressure-sensitive adhesives include linear, radial, star and tapered styrene-isoprene block copolymers such as KRATON™ D1107P, available from Shell Chemical Co., and EUROPRENE™ SOL TE 9110, available from EniChem Elastomers Americas, Inc.; linear styrene-(ethylene-butylene) block copolymers such as KRATON™ G1657, available from Shell Chemical Co.; linear styrene-(ethylene-propylene) block copolymers such as KRATON™ G1750X, available from Shell Chemical Co.; and linear, radial, and star styrene-butadiene block copolymers such as KRATON™ D1118X available from Shell Chemical Co., and EUROPRENE™ SOL TE 6205, available from EniChem Elastomers Americas, Inc. The polystyrene blocks tend to form domains in the shape of spheroids, cylinders, or plates that causes the block copolymer pressure-sensitive adhesives to have two phase structures. Resins that associate with the rubber phase generally develop tack in the pressure-sensitive adhesive. Examples of rubber phase associating resins include aliphatic olefin-derived resins, such as the ESCOREZ™ 1300 series and the WINGTACK™ series, available from Goodyear; rosin esters, such as the FORAL™ series and the STAYBE-LITE™ Ester 10, both available from Hercules, Inc.; hydrogenated hydrocarbons, such as the ESCOREZ™ 5000 series, available from Exxon; polyterpenes, such as the PICCOLYTE™ A series; and terpene phenolic resins derived from petroleum or terpentine sources, such as PIC-COFYN™ A100, available from Hercules, Inc. Resins that associate with the thermoplastic phase tend to stiffen the pressure-sensitive adhesive. Thermoplastic phase-associating resins include polyaromatics, such as the PICCO™ 6000 series of aromatic hydrocarbon resins, available from Hercules, Inc.; coumarone-indene resins, such as the CUMAR™ series, available from Neville; and other high-solubility parameter resins derived from coal tar or petroleum and having softening points above about 85° C., such as the AMOCO™ 18 series of alphamethyl styrene resins, available from Amoco, PICCOVAR™ 130 alkyl aromatic polyindene resin, available from Hercules, Inc., and the PICCOTEX™ series of alphamethyl styrene/vinyl toluene resins, available from Hercules. Other materials can be added for special purposes, including rubber phase plasticizing hydrocarbon oils, such as, TUFFLO™ 6056, available from Arco, Polybutene-8 from Chevron, KAYDOL™, available from Witco, and SHELLFLEX™ 371, available from Shell Chemical Co.; pigments; antioxidants, such as IRGANOX™ 1010 and IRGANOX™ 10763, both available from Ciba-Geigy Corp., BUTAZATE™, available from Uniroyal Chemical Co., CYANOX™ LDTP, available from American Cyanamide, and BUTASAN™, available from Monsanto Co.; antiozonants, such as NBC, a nickel dibutyldithiocarbamate, available from DuPont; and ultraviolet light inhibitors, such as IRGANOX™ 1010 and TINUVIN™ P, available from Ciba-Geigy Corp.

Another class of pressure sensitive adhesives useful in the invention include silicone pressure sensitive adhesives. Silicone pressure sensitive adhesives generally comprise two major components, a polymer or gum, and a tackifiing resin. The polymer is typically a high molecular weight polydimethylsiloxane or polydimethyldiphenylsiloxane, that contains residual silanol functionality (SiOH) on the ends of the polymer chain, or a block copolymer comprising lower molecular weight polydimethylsiloxane or polydimethyldiphenylsiloxane segments connected by diurea linkages. The tackifying resin is generally a three-dimensional silicate structure that is endcapped with trimethylsiloxy groups (OSiMe$_3$) and also contains some residual silanol functionality. Examples of tackifying resins include SARTOMER™ 545, from General Electric Co., Silicone Resins Division, Waterford, N.Y., and MQD-32-2 from Shin-Etsu Silicones of America, Inc., Torrance, Calif. Manufacture of typical silicone pressure-sensitive adhesives is described in U.S. Pat. No. 2,736,721(Dexter). Manufacture of silicone urea block copolymer pressure-sensitive adhesive is described in U.S. Pat. No. 5,214,119 (Leir, et al). As identified with other classes of pressure-sensitive adhesives, other materials can be added to the silicone pressure-sensitive adhesives, including, but not limited to pigments, plasticizers, and fillers. Fillers are typically used in amounts from 0 parts to 10 parts per 100 parts of silicone pressure-sensitive adhesive. Examples of fillers that can be used include zinc oxide, silica, carbon black, pigments, metal powders and calcium carbonate.

As described in each class of pressure-sensitive adhesives above, tackifliers, plasticizers and fillers are optionally included in pressure sensitive adhesives used for the present invention. These components are added to design the adhesive so that it is particularly suited for its intended use. Tackifiers can be included such as hydrocarbon resins, rosin, natural resins such as dimerized or hydrogenated balsams and esterified abietic acids, polyterpenes, terpene phenolics, phenol-formaldehyde resins, and rosin esters. Other additives such as amorphous polypropylene or various waxes may also be used. Plasticizers such as polybutene, paraffinic oils, petrolatum, and certain phthalates with long aliphatic side chains such as ditridecyl phthalate may be added to the adhesives used in the invention. Pigments and fillers may also be incorporated into the adhesive composition in order to manipulate the properties of the adhesive according to its intended use. For instance, very fine pigments increase cohesive strength and stiffness, reduce cold flow, and also reduce tack. Plate-like pigments such as mica, graphite, and talc are preferred for acid and chemical resistance and low gas permeability. Coarser pigments increase tack. Zinc oxide increases tack and cohesive strength. Aluminum hydrate, lithopone, whiting, and the coarser carbon blacks such as thermal blacks also increase tack with moderate increase in cohesivity. Clays, hydrated silicas, calcium silicates, silico-aluminates, and the fine furnace and thermal blacks increase cohesive strength and stiffness. Finally, antioxidants may be used to protect against severe environmental aging caused by ultraviolet light or heat. One skilled in the art will recognize that certain situations call for special types of plasticizers, tackifiers, pigments, fillers and/or antioxidants and selection can be critical to the performance of the adhesive.

Low Adhesion Backsize (LAB)

The invention may optionally include a layer of low adhesion backsize. The LABs may include, for example, waxes such as polyethylene and oleamide; silicones such as diorganopolysiloxanes; and long chained branched polymers such as polyvinylstearate, polyvinylcarbamates and fluorocarbon copolymers. However, a feature of the invention is that it provides a tape construction which does not require low adhesion backsize in order to achieve easy unwind from a roll of tape if the appropriate combination of adhesives and composite backing is employed. If the polymer is polyethylene-based and the adhesive is either an acrylic/thermoplastic elastomer blend or an acrylic/elastomer blend with or without tackifiers, plasticizers or fillers, a LAB is not necessary. By easy unwind it is meant that the adhesive releases from the cloth side of the tape without requiring undue force and without the adhesive pulling away from the polymer side of the backing. Manufacturing costs are reduced in tape constructions of the invention since an additional material, the low adhesion backsize, is not necessary in order to provide a useful pressure sensitive adhesive tape having good unwind properties.

EXAMPLES

The invention is further explained by the following examples which are intended as nonlimiting. Unless otherwise indicated all parts and percents are expressed in parts by weight.

Unless otherwise indicated the following test methods were used in the Examples.

Tear

Figure 8:
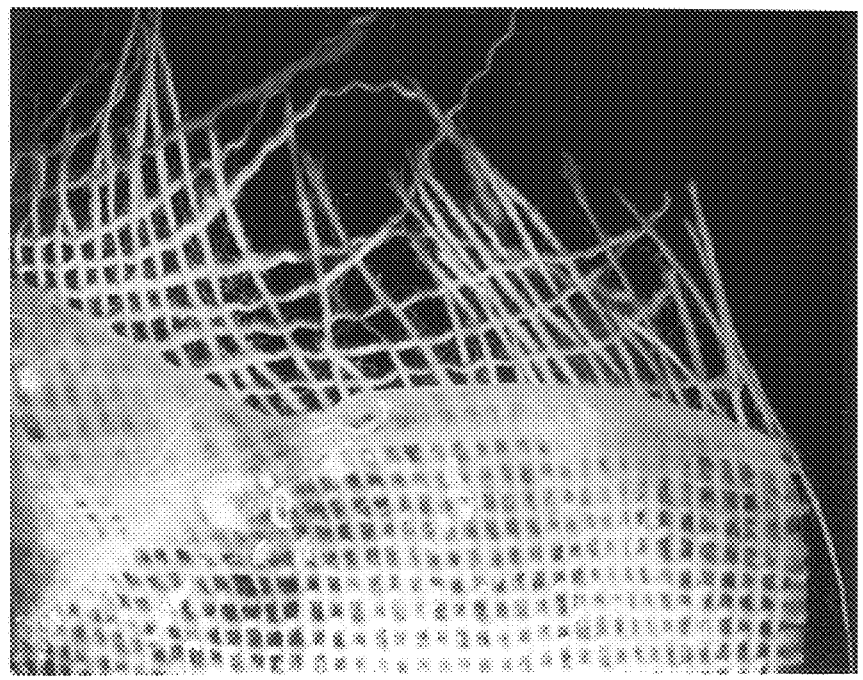
FIG. 8 is a light micrograph of a comparative sample of woven cloth/polymer backing which was torn in the cross-web direction; this is an unacceptable tear and is designated as a "1" tear described in the test methods below.

Samples were grasped between the index finger and the thumb of both hands and torn in the cross direction of the sample. The tear line was examined for fraying and/or delamination of the polymer from the cloth. The amount of force required to initiate the tear was also considered. The specimen was then tested in a similar fashion in the machine direction with the same observations noted. If minimal fraying and no delamination was observed in the sample, and relatively low forces were needed to initiate and propagate the tear across the sample, the sample demonstrated acceptable tear properties. If delamination, fraying, or large forces were necessary to initiate and propagate the tear the sample had unacceptable or poor tear properties. This procedure was repeated for the down-web direction. For both the web direction and cross-web direction tears, the tear was rated as:

1 Very poor tear with excessive fraying and delamination. A representative tear designated as "1" is shown in FIG. 8.

2 Poor tear with large amount of fraying and delamination.

Figure 9:
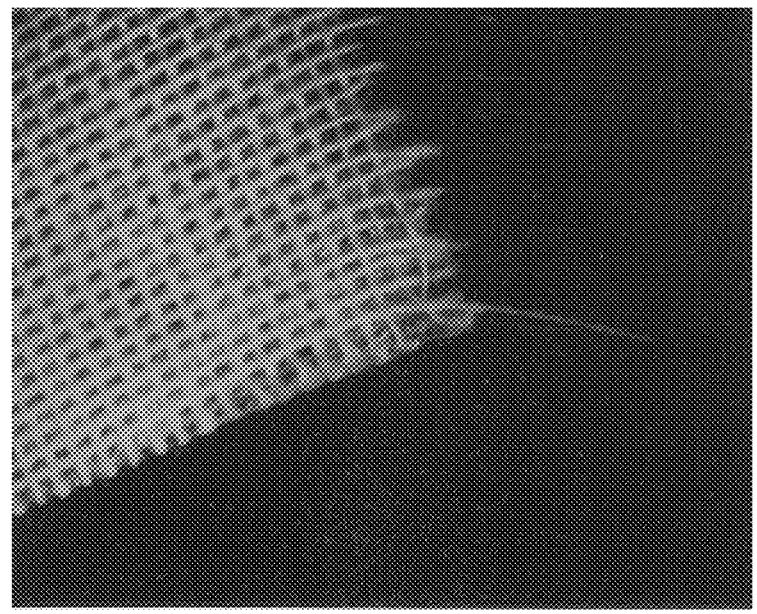
FIG. 9 is a light micrograph of a comparative sample of woven cloth/polymer backing which was torn in the cross-web direction; this is an average tear and is designated as a "3" tear described in the test methods below.

3 Average tear with some fraying and little delamination. A representative tear designated as "3" is shown in FIG. 9.

4 Good tear with minimal fraying and no delamination.

Figure 10:
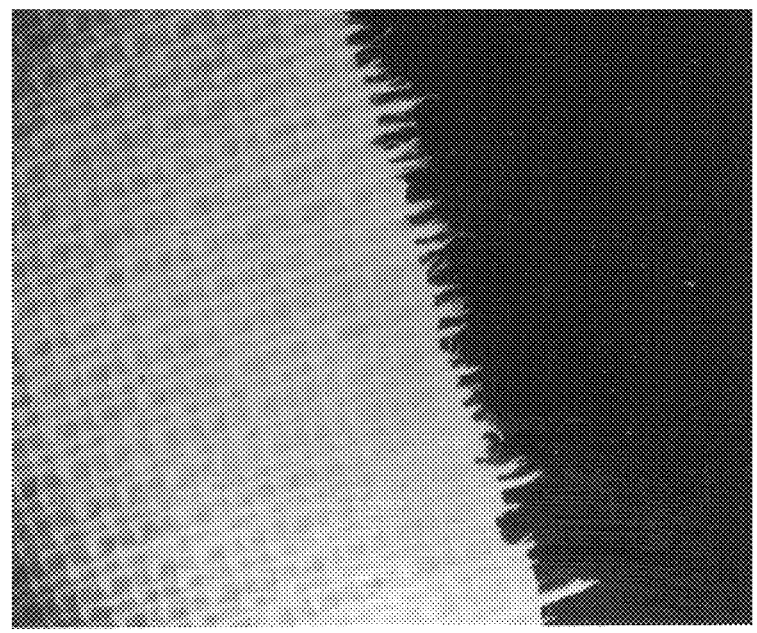
FIG. 10 is a light micrograph of a sample of woven cloth/polymer backing prepared according to the invention which was torn in the cross-web direction; this is an excellent tear and is designated as a "5" tear described in the test methods below.

5 Excellent tear with no fraying or delamination. A representative tear designated as "5" is shown in FIG. 10.

Tapes or backings prepared according to the invention exhibit tears of 4 or 5 when torn by hand and the tear line is substantially straight.

Tensile Measurements

Tensile strength at break, elongation at break and modulus of an extruded film, adhesive tape and/or fabric in the machine or cross direction, either wet or dry was determined in the following manner. A 10.2 cm long by 2.5 cm wide sample was placed between the Instron Tensile tester jaws to expose a 5.1 cm gauge length. The crosshead and chart speeds were set at 25.4 centimeters per minute. The jaws were drawn apart at 25.4 cm/min until a break was detected by the machine. Tensile, elongation, and Fn Modulus(force required to elongate a sample n percent) were calculated via the Instron software.

Adhesion to Steel

Adhesion to steel was determined without any sample dwell on the steel according to this procedure. This test standard is based on the ATSM D1000 Adhesion Test.

Tape samples were cut into 2.5 cm by 30.5 cm strips. The samples were adhered to the center of a cleaned steel surface (cleaned with 50% n-heptane/50% isopropyl alcohol) adhesive side down, so that 12.7 to 17.8 cm of sample extended beyond the steel surface. The tape was rolled once in each direction with a 2.0 Kg roller at a rate approximately 5.1 cm per second. The free end of the sample was then doubled back on itself and approximately 2.5 cm was peeled from the steel plate. The end of the panel from which the specimen had been removed was placed in the lower jaw of the tester. The free end was folded to form a small tab and was placed in the upper jar as above. The specimen was mechanically removed from the plate by activating the Instron at a crosshead speed of 30.5 cm per minute and data was recorded on the computer software. The average of three peel values were reported in ounces per inch and converted to the units of Newtons/decimeter.

Adhesive Adhesion to Composite Backing (2 Bond)

A strip of the sample was placed on the panel as described above so that the sample extended 2.5 cm beyond each end of the panel. With the roller described above, the sample was rolled once in each direction at a rate of 5.1 cm per second. Another strip of sample was applied with the adhesive covering the backside of the first. This was rolled once in each direction with a 2.0 Kg roller at a rate of approximately 5.1 cm per second. The free end of the sample was then doubled back on itself and approximately 2.5 cm was peeled from the initial bonded specimen. The end of the panel from which the sample was removed was placed in the lower jaw of the tester. The free end was folded to form a small tab and was placed in the upper jaw as above. The sample was mechanically removed from the specimen by activating the Instron at a crosshead speed of 30.48 cm per minute and data was recorded on the computer software. The average of three peel values were reported in the units of ounces/inch and converted to Newtons/decimeter.

Hand or Flexibility

The following procedure describes the method of determining the "hand" drape or flexibility of composite materials(nonwovens, wovens, etc,) using the Thwing-Albert Handle-O-Meter.

Samples were cut into squares having measurements such as 20.3×20.3 cm or 10.2×10.2 cm. The web and cross-web direction of the samples was marked on each sample. Areas containing wrinkles or creases were avoided when preparing the specimens. The slot width on the Thwing-Albert Handle-O-Meter was set to 0.6 cm and a specimen was placed under the blade with the web direction perpendicular to the slot. The direction tested was always perpendicular to the slot. The apparatus was activated causing the platform to rise and engage the specimen and forced the specimen into the slot opening. The platform motion stopped when the test cycle was completed and displayed the maximum resistance force of the blade encountered while pushing the sample through the slot. The procedure was then repeated by putting the cross-web direction perpendicular to the slot. The sample was rotated 90 degrees and both sides of the specimen were measured, thus two values were obtained for both the web direction and the cross-web direction. The values were averaged to obtain the web direction and the cross-web direction measurements. Generally, as drape or hand measurements decrease the sample is more conformable.

Unwind Adhesion

This procedure was used to measure the force necessary to unwind tape from a roll. An Instron tensile tester was modified by removing the bottom grip of the sample holder and equipping it with an unwind fixture that resembles a spindle. A 2.5 cm wide finished roll of the tape was placed on the fixture and approximately a 10.2 cm piece of tape was unwound from the roll. A tab was formed at the end. The tab was placed in the upper grip of the Instron so the gauge length was approximately 5.1 cm. The crosshead was started in motion at a rate of 30.5 cm per minute and unwound at least 15.2 cm from the roll. The average unwind adhesion was recorded by the Instron software and was reported as an average in ounces per inch and converted to Newtons/decimeter. The unwound portion of the tape was also examined for adhesive transfer, delamination, or tearing.

Moisture Vapor Transmission of Materials

The moisture vapor transmission rates of the samples were tested using either the upright method or the inverted method as described below.

Upright method: Glass bottles were filled with approximately 50 ml of water. Three test samples and three control samples were cut into 3.8 cm diameter samples using a round die cutter. The samples were sandwiched between two foil rings which had holes in the centers. A rubber gasket was placed between the bottom of the foil and the glass container. A screw cap with a 3.8 cm diameter hole was attached to the glass jar enclosing the foil-sample sandwich and gasket to the glass. The samples were conditioned for four hours at 40 degrees C. at 20% humidity in a control chamber. The cap was then tightly secured to the jar and the jar was removed from the chamber and weighed on an analytical balance to the nearest 0.01 gram. The jars were returned to the chamber for at least 18 hrs (at the conditions listed above). The bottles were then removed and weighed immediately to the 0.01 gram. Moisture vapor rates were calculated by the change in weight multiplied by the exposed area divided by the time they were exposed. Rates are reported in grams per square meter in 24 hours.

Inverted method: The same procedure was followed as outlined above. However, after conditioning the samples in the chamber, and weighing, the samples were returned to the chamber and the bottles were inverted so that the water contacted the test surface. The bottles were left undisturbed for at least 18 hrs. The bottles were then removed, weighed, and moisture vapor transmission rate was calculated as above.

Two Bond: Anchorage, Bond

This procedure was used to measure the force necessary to remove a pressure sensitive adhesive coating from its backing using masking tape manufactured by 3M Company as Tape No. 254 as a test tape. Samples were cut into 2.5 cm wide×30.5 cm long strips. Using a clean steel plate, a 2.5 cm wide strip of double coated tape (3M Brand Double Stick Tape available from 3M of St. Paul, Minn.) without liner was centered and attached to the plate. The specimen tape was superimposed on the double coated tape exposing the adhesive side of the tape. A 30.5 cm strip of test tape was then centered on the specimen, bonding the adhesive of the specimen to the adhesive of the standard test tape. The construction was then rolled at 228.6 cm per minute with the 2.0 Kg roller. A tab was formed with the standard test tape, attached to the jaw, and the carriage was started in motion (approximately 127.0 cm per minute). The carriage moved the construction while the jaw held the test tape. The force required to remove the adhesive was reported in ounces/inch and converted to Newtons/decimeter and observations of any failures that might have occurred were made. Examples of failures include splitting, transfer, or backing delamination from the double coated tape were noted.

5 Bond

The following procedure was used to measure the cohesive strength of the adhesive using a 1,750 gram static load. Six samples were cut into 1.3 cm wide by 15.2 cm long specimen strips. The end of the strips were attached in a 1.3 cm×1.3 cm area bonding adhesive to adhesive. The other ends were wound around brass hooks. One hook was attached to a stationary peg while the other was attached to a 1,750 gram weight. When the samples debonded from one another, the weight fell activating a shut-off timer. The average of three samples was reported in minutes to debond.

Web Porosity

This procedure was used to measure the porosity of backing materials by measuring the time required for a volume of 10 cc of air under constant pressure to pass through a known area of sample. Samples were cut into 5.1 cm×5.1 cm squares. Using a Gurley Densometer, samples were inserted into the orifice plates and clamped. The spring catch was disengaged lowering the inner cylinder to settle under its own weight. The time for the top edge of the cylinder to reach the ZERO line was recorded which was the time it took 10 cc of air to pass through the sample as measured in seconds. If the cylinder did not move after 5 minutes, a value of 301 seconds was recorded. As sample materials increase in porosity, the time interval decreases. The average results of three samples was reported.

Delamination

To determine if the polymer pulled away from the woven cloth in a polymer/cloth backing, the polymeric film was grasped and pulled at about a 40 degree angle across the polymer/cloth backing. If the film can be lifted away from the cloth without significant deformation of the polymer or of the cloth, the sample is said to delaminate.

Curl

Samples were torn. The torn edges were examined to determine if they curled or not. Strong curling is considered undesirable for tapes of the invention.

Skin Adhesion

Skin adhesion was carried out by placing tape samples 2.5 cm wide by 7.5 cm long on the back of a human subject. Each tape was rolled down with one forward and one reverse pass using a 2.0 Kg roller moved at a rate of about 30.0 cm/min. Adhesion to the skin was measured as the peel force required to remove the tape at 180 degree angle at a 15.0 cm/min. rate of removal. Adhesion was measured immediately after initial application ($T_0$) and after 48 hours ($T_{48}$). Preferred skin adhesives generally exhibit a $T_0$ of between about 1.2 to 3.9 N/dm and a $T_{48}$ of between about 5.8 to 11.6 N/dm. Results of 9 tests were averaged.

Skin Adhesion Lift Test

When the 24 hour skin adhesion test was performed, the tape sample was examined for the amount of area that was lifted (released) from the skin prior to removal of the tape and ratings were given as:

| | |
|---|---|
| 0 | no visible lift |
| 1 | lift only at edges of tape |
| 2 | lift over 1% to 25% of test area |
| 3 | lift over 25% to 25% of test area |
| 4 | lift over 50% to 75% of test area |
| 5 | lift over 75% to 100% of test area |

Results of 9 tests were averaged. Preferred skin adhesives will generally exhibit an average rating below about 2.5.

Skin Residue Test

When the 24 hour skin adhesion test was performed, the skin underlying the tape sample was visually inspected to determine the amount of adhesive residue on the skin surface and was rated as:

| | |
|---|---|
| 0 | no visible residue |
| 1 | residue only at edges of tape |
| 2 | residue covering 1% to 25% of test area |
| 3 | residue covering 25% to 50% of test area |
| 4 | residue covering 50% to 75% of test area |
| 5 | residue covering 75% to 100% of test area |

Results of 9 tests were averaged. Preferred skin adhesives will generally exhibit an average rating below 2.5.

Moist Skin Adhesion Test

Human subjects were placed in a controlled environment room where the temperature was maintained at a constant 32° C. and 30% relative humidity for 30 minutes to induce perspiration. If after 20 minutes the panelists had not begun to perspire, they were offered hot drinks to further induce perspiration. Skin adhesions were carried out by placing 2.5 cm wide by 7.5 cm long on the panelists perspirated back. Each tape was rolled down with one forward and one reverse pass using a 2.0 Kg roller moved at a rate of about 30.0 cm/min. Adhesion to skin was measured as a peel force required to remove the tape at a 180 degree angle at a 15.0 cm/min. Adhesion was measured immediately after the initial application ($T_0$). Results of 10 tests were recorded as g/in., averaged and converted to Newtons/dm.

Example 1

Example 1 illustrates varying cloth weave densities and varying film thicknesses are useful in the present invention.

Films having a thickness of 62.5 microns (2.5 mils),l125 microns (5.0 mils) and 225 microns (9.0 mils) were prepared using a polyolefin elastomer based on a copolymer of ethylene and 1-octene with a melt flow index of 5 dg/min. These films were hot pressed to grade 80 woven cotton cheese cloth (Burcott Mills of Chicago, Ill.) using a Carver platen press at 180 degrees C. and 1362 Kg pressure. The various thread counts used for the samples are shown in Table 1 below. The total thickness of the resulting polymer film/cloth composites were between 200–250 microns. Tensile measurements were completed on the polymer films, woven cloths and composites generated by the combination of the two. Tensile measurements were also completed on Zonas Porous Brand adhesive tape available from Johnson & Johnson Medical, Inc. of Arlington, Tex. as a control. Tables 1–3 show tensile results.

TABLE 1

Cloth Tensile

| Thread Count | Direction | Load @ Break (Newtons) |
|---|---|---|
| 20 × 12 | DOWN | 44 |
| 20 × 12 | CROSS | 2 |
| 28 × 24 | DOWN | 36 |
| 28 × 24 | CROSS | 25 |
| 32 × 28 | DOWN | 79 |
| 32 × 28 | CROSS | 63 |
| 40 × 32 | DOWN | 105 |
| 40 × 32 | CROSS | 52 |
| 44 × 36 | DOWN | 101 |
| 44 × 36 | CROSS | 82 |
| 66 × 42 | DOWN | 167 |
| 66 × 42 | CROSS | 87 |

TABLE 2

Film Tensile

| Polymer Thicknesses | Load @ Break (Newtons) |
|---|---|
| 62.5 mil down | 14 |
| 62.5 mil cross | 7 |
| 125.0 mil down | 18 |
| 125.0 mil cross | 15 |
| 225.0 mil down | 31 |
| 225.0 mil cross | 30 |

TABLE 3

Cloth/Polymer Composite Tensile

| Polymer Thickness (microns)/ Cloth Thread Count per 2.54 cm | Direction | Load @ Break (Newtons) |
|---|---|---|
| 62.5/20 × 12 | DOWN | 51 |
| 62.5/20 × 12 | CROSS | 8 |
| 62.5/28 × 24 | DOWN | 59 |
| 62.5/28 × 24 | CROSS | 32 |
| 62.5/32 × 28 | DOWN | 58 |
| 62.5/32 × 28 | CROSS | — |
| 62.5/40 × 32 | DOWN | 110 |
| 62.5/40 × 32 | CROSS | 22 |
| 62.5/44 × 36 | DOWN | 153 |
| 62.5/44 × 36 | CROSS | — |
| 62.5/66 × 42 | DOWN | 179 |
| 62.5/66 × 42 | CROSS | 99 |
| 125.0/40 × 32 | DOWN | 127 |
| 125.0/40 × 32 | CROSS | 18 |
| 225.0/40 × 32 | DOWN | 116 |
| 225.0/40 × 32 | CROSS | 27 |
| Zonas Porous Brand Tape | DOWN | 167 |

The cloth and polymer were very difficult to tear alone. The cloth required a large amount of force to tear, and upon tearing the cloth frayed and became unusable. The polymer tore relatively easily once the tear was initiated, however, it was not clean or straight. By combining these two materials at low thread counts acceptable tensile and tear properties were achieved.

All of the above cloth weaves were not hand tearable in the cross-web direction without excessive fraying as exemplified in FIG. 8. However, once the low density weave cloths were formed into composites with a polymer the samples were hand tearable in the cross direction. The composite samples all showed good bonding of the polymer to the cloth, good tensile strength in both directions, 45 degree bias and straight line tearing in the cross and down-web directions.

In summary, the tensile properties of the cloth and composites show similar trends. As the thread count of the cloth increases, the tensile(load at break) of the materials also increases. In the case of the polymer, changes were seen when different thicknesses were used. The purpose of the polymer layer is two-fold, it serves as a barrier layer for the adhesive and more importantly, it binds the crossover points of the cloth to provide good tear properties in both directions.

Example 2

Example 2 illustrates that different polymers are useful in preparing composite backings of the present invention.

Polymeric materials as identified in Table 4 below were extrsion coated onto 44×36 threads per 2.5 cm cotton cheese cloth (available from DeRoyale Textiles of South Carolina supplied through Burcott Mills of Chicago, Ill.). Films were extrusion coated onto the cloth using a 4.4 cm Killion single screw extruder equipped with a 25.4 cm Cloeren die, and Rotary Automation film take-away system. After the polymer was extruded onto the cloth, the polymer/cloth composite was nipped between a chrome cast roll and nip roll at 4.5 N per lineal centimeter at temperatures ranging from 35–70 degrees C. The polymeric films and the processing conditions are listed in Table 4 below.

TABLE 4

Composites containing different polymers

| Sample # | Polymer Tradename | Polymer Type | Polymer Thickness (microns) | Thread Count | Ext. Temp (C.) | Cast roll Temp (C.) | Line Speed (m/min.) |
|---|---|---|---|---|---|---|---|
| 2A | Attane 4802 (Dow) | Polyethylene copolymer | 75.5–82.5 | 44 × 36 | 254 | 70 | 2.1 |
| 2B | Attane 4802 (Dow) | Polyethylene copolymer | 50–62.5 | 44 × 36 | 254 | 70 | 3.1 |
| 2C | Attane 4802 (Dow) | Polyethylene copolymer | 30–37.5 | 44 × 36 | 254 | 70 | 4.6 |
| 2D | Flexomer 1137 (Union Carbide) | Polyethylene copolymer | 62.5 | free film | 185 | 70 | 2.1 |
| 2E | Flexomer 1137 (Union Carbide) | Polyethylene copolymer | 77.5–82.5 | 44 × 36 | 185 | 70 | 1.7 |
| 2F | Flexomer 1137 (Union Carbide) | Polyethylene copolymer | 47.5–52.5 | 44 × 36 | 185 | 70 | 2.7 |
| 2G | Flexomer 1137 (Union Carbide) | Polyethylene copolymer | 33.8–38.8 | 44 × 36 | 185 | 70 | 4.0 |
| 2H | Hytrel 4056 (duPont) | Polyester elastomer | 62.5 | free film | 190 | 50 | 3.1 |
| 2I | Hytrel 4056 (duPont) | Polyester elastomer | 62.5 | 44 × 36 | 190 | 50 | 3.1 |
| 2J | Hytrel 4056 (duPont) | Polyester elastomer | 72.5–80.0 | 44 × 36 | 190 | 50 | 2.3 |
| 2K | Hytrel 4056 (duPont) | Polyester elastomer | 45.0–52.5 | 44 × 36 | 190 | 50 | 3.4 |
| 2L | Hytrel 4056 (duPont) | Polyester elastomer | 35.0–37.5 | 44 × 36 | 190 | 50 | 4.6 |
| 2M | Flexomer 1138 (Union Carbide) | Polyethylene copolymer | 62.5 | free film | 204 | 50 | 3.1 |
| 2N | Flexomer 1138 (Union Carbide) | Polyethylene copolymer | 77.5–82.5 | 44 × 36 | 204 | 50 | 2.4 |

TABLE 4-continued

Composites containing different polymers

| Sample # | Polymer Tradename | Polymer Type | Polymer Thickness (microns) | Thread Count | Ext. Temp (C.) | Cast roll Temp (C.) | Line Speed (m/min.) |
|---|---|---|---|---|---|---|---|
| 2O | Flexomer 1138 (Union Carbide) | Polyethylene copolymer | 47.5–52.5 | 44 × 36 | 204 | 50 | 3.7 |
| 2P | Flexomer 1138 (Union Carbide) | Polyethylene copolymer | 32.5–37.5 | 44 × 36 | 204 | 50 | 5.5 |
| 2Q | Flexomer 1138 w/ 1 % red pigment | Polyethylene copolymer | 47.5–52.5 | 44 × 36 | 204 | 50 | 3.7 |
| 2R | Kraton 1107 (Shell) | Block Copolymer | 67.5–82.5 | 44 × 36 | 204 | 50 | 5.3 |
| 2S | Kraton 1107 (Shell) | Block Copolymer | 47.5–57.5 | 44 × 36 | 204 | 50 | 7.6 |
| 2T | Kraton 1107 (Shell) | Block Copolymer | 40.0–52.5 | 44 × 36 | 204 | 50 | 9.1 |
| 2U | LLDPE 6806 (Dow) | Polyethylene | 70.0–77.5 | 44 × 36 | 160 | 38 | 7.6 |
| 2V | LLDPE 6806 (Dow) | Polyethylene | 45.0–52.5 | 44 × 36 | 160 | 38 | 11.0 |
| 2W | LLDPE 6806 (Dow) | Polyethylene | 30.0–32.5 | 44 × 36 | 160 | 38 | 13.7 |
| 2X | 15% LLDPE 6806/ 85% Flexomer 1138 | Polymer blend | 70.0–77.5 | 44 × 36 | 204 | 50 | 2.6 |
| 2Y | 15% LLDPE 6806/ 85% Flexomer 1138 | Polymer blend | 45.0–52.5 | 44 × 36 | 204 | 50 | 4.0 |
| 2Z | 15% LLDPE 6806/ 85% Flexomer 1138 | Polymer blend | 27.5–32.5 | 44 × 36 | 204 | 50 | 5.2 |
| 2AA | 15% LLDPE 6806/ 85% Flexomer 1138 | Polymer blend | 12.5–20.0 | 44 × 36 | 204 | 50 | 6.1 |
| 2BB | 30% LLDPE 6806/ 70% Flexomer 1138 | Polymer blend | 77.6–82.5 | 44 × 36 | 204 | 50 | 2.6 |
| 2CC | 30% LLDPE 6806/ 70% Flexomer 1138 | Polymer blend | 47.5–50.0 | 44 × 36 | 204 | 50 | 4.0 |
| 2DD | 30% LLDPE 6806/ 70% Flexomer 1138 | Polymer blend | 27.5–30.0 | 44 × 36 | 204 | 50 | 5.2 |
| 2EE | 45% LLDPE 6806/ 55% Flexomer 1138 | Polymer blend | 70.0–77.5 | 44 × 36 | 204 | 50 | 2.7 |
| 2FF | 45% LLDPE 6806/ 55% Flexomer 1138 | Polymer blend | 47.5–52.5 | 44 × 36 | 204 | 50 | 4.0 |
| 2GG | 45% LLDPE 6806/ 56% Flexomer 1138 | Polymer blend | 30.0–35.0 | 44 × 36 | 226 | 50 | 6.1 |
| 2HH | Escorene LD-312.09 (Exxon) | Ethylene Vinyl Acetate | 62.5 | free film | 226 | 50 | 3.1 |
| 2II | Escorene LD-312.09 (Exxon) | Ethylene Vinyl Acetate | 75.0–82.5 | 44 × 36 | 226 | 50 | 2.5 |
| 2JJ | Escorene LD-312.09 (Exxon) | Ethylene Vinyl Acetate | 47.5–52.5 | 44 × 36 | 226 | 50 | 4.0 |
| 2KK | Escorene LD-312.09 (Exxon) | Ethylene Vinyl Acetate | 22.5–25.0 | 44 × 36 | 226 | 50 | 7.6 |
| 2LL | Elvax 240 (duPont) | Ethylene Vinyl Acetate | 77.5–82.5 | 44 × 36 | 182 | 32 | 3.8 |
| 2MM | Elvax 240 (duPont) | Ethylene Vinyl Acetate | 45.0–50.0 | 44 × 36 | 162 | 32 | 6.2 |
| 2NN | Elvax 240 (duPont) | Ethylene Vinyl Acetate | 25.0–30.0 | 44 × 36 | 182 | 32 | 9.5 |
| 2OO | Elvax 40W (duPont) | Ethylene Vinyl Acetate | 72.5–80.0 | 44 × 36 | 193 | 32 | 4.6 |
| 2PP | Elvax 40W (duPont) | Ethylene Vinyl Acetate | 47.5–52.5 | 44 × 36 | 193 | 32 | 6.1 |
| 2QQ | Elvax 40W (duPont) | Ethylene Vinyl Acetate | 27.5–30.0 | 44 × 36 | 193 | 32 | 10.1 |
| 2RR | Engage 8200 (Dow) | Polyethylene Elastomer | 66.5 | 44 × 36 | 204 | 68 | 12.8 |
| 2SS | Engage 8200 (Dow) | Polyethylene Elastomer | 53.0 | 44 × 36 | 204 | 68 | 16.5 |
| 2TT | Engage 8200 (Dow) | Polyethylene Elastomer | 24.3 | 44 × 36 | 204 | 68 | 27.5 |

The composites prepared in Table 4 were slit to 8.9 cm rolls for post-extrusion experiments. The composites were subjected to post calendering to further embed the polymer to the woven substrate. The cloth/polymer composites was nipped between a plasma coated cast roll and rubber back-up roll at about 162 degrees C. at 193 N per lineal cm between 0.6 to 2.4 m/min. The samples were tested for tensile strength, elongation, tear, drape, and porosity. Control samples were also tested. The control backing was a non-occlusive, i.e., breathable, woven backing consisting of 180×48 plain weave acetate taffeta cloth, 75 denier fiber in warp direction, 150 denier fiber in weft direction, available from Milliken and Co. of Spartanburg, Ga. The cloth was a 70×52 bleached pure finished 100% cotton print cloth available from Burcott Mills of Chicago, Ill. Neither the cloth nor the control were coated with polymer.

TABLE 5

Properties of Different Polymeric Composites

| Sample | Tensile (Newtons) | Elongation (%) | Tear 1 = Poor 5 = Good | Drape | Porosity (sec.) |
|---|---|---|---|---|---|
| 2A | 157 | 6 | 5 | 210 MD / 142 CD | 263.0 |
| 2B | 144 | 6 | 5 | 139 MD / 77 CD | 33.8 |
| 2C | 130 | 5 | 5 | 94 MD / 43 CD | 1.8 |
| 2E | 162 | 7 | 5 | 179 MD / 95 CD | 95.7 |
| 2F | 144 | 6 | 5 | 93 MD / 58 CD | 247.7 |
| 2G | 132 | 5 | 5 | 78 MD / 36 CD | 71.0 |
| 2I$_{NPC}$ | 119 | 6 | 1 | 90 MD / 34 CD | 133.8 |
| 2J | 136 | 5 | 5 | 113 MD / 67 CD | 83.4 |
| 2K | 123 | 5 | 5 | 60 MD / 32 CD | 98.3 |
| 2L | 126 | 5 | 3 | 51 MD / 26 CD | 15.9 |
| 2N | 146 | 6 | 5 | 142 MD / 74 CD | 354.0 |
| 2O | 137 | 6 | 5 | 86 MD / 42 CD | 250.8 |
| 2P | 121 | 6 | 5 | 45 MD / 19 CD | 4.7 |
| 2P$_{NPC}$ | 110 | 6 | — | 99 MD / 47 CD | 384.4 |
| 2Q | 137 | 5 | 5 | 86 MD / 47 CD | 395.1 |
| 2R | 114 | 5 | 5 | 41 MD / 21 CD | >600 |
| 2S | 112 | 5 | 5 | 31 MD / 20 CD | 466.3 |
| 2T | 111 | 5 | 5 | 30 MD / 19 CD | 480.5 |
| 2U | 169 | 6 | 5 | 412 MD / 305 CD | 10.3 |
| 2V | 159 | 5 | 5 | 296 MD / 182 CD | 0.6 |
| 2W | 138 | 5 | 4 | 217 MD / 132 CD | 0.2 |
| 2X | 133 | 7 | 5 | 144 MD / 86 CD | 335.3 |
| 2Y | 119 | 5 | 4 | 98 MD / 57 CD | 152.6 |
| 2Z | 126 | 5 | 4 | 65 MD / 31 CD | 137.4 |
| 2AA | 112 | 5 | 5 | 88 MD / 43 CD | 126.4 |
| 2BB | 145 | 6 | 5 | 185 MD / 111 CD | 213.1 |
| 2CC | 133 | 6 | 5 | 108 MD / 50 CD | 108.3 |
| 2DD | 130 | 6 | 1 | 156 MD / 88 CD | 152.9 |
| 2EE | 159 | 6 | 5 | 171 MD / 136 CD | 202.1 |
| 2FF | 146 | 6 | 5 | 127 MD / 70 CD | 41.1 |
| 2GG | 132 | 6 | 1 | 118 MD / 63 CD | 42.3 |
| 2II | 155 | 6 | 5 | 204 MD / 132 CD | 150.1 |
| 2JJ | 149 | 5 | 5 | 123 MD / 68 CD | 115.6 |
| 2KK | 135 | 5 | 4 | 79 MD / 33 CD | 0.3 |
| 2LL | 130 | 5 | 4 | 68 MD / 40 CD | 53.5 |
| 2LL$_{NPC}$ | 114 | 5 | 4 | 75 MD / 36 CD | 108.1 |
| 2MM | 114 | 5 | 5 | 59 MD / 31 CD | 12.4 |
| 2NN | 117 | 5 | 2 | 65 MD / 32 CD | 0.2 |
| 2OO | 117 | 5 | 4–5 | 50 MD / 28 CD | 252.5 |
| 2PP | 123 | 5 | 4–5 | 44 MD / 25 CD | 93.9 |
| 2QQ | 101 | 5 | 3 | 46 MD / 23 CD | 1.57 |
| 2RR | 124 | 5 | 5 | 83 MD / 55 CD | >400 |
| 2SS | 129 | 6 | 5 | 70 MD / 47 CD | >400 |
| 2TT | 111 | 5 | 5 | 63 MD / 40 CD | 53.4 |
| Backing | 113 | 5 | 3 | 109 MD / 63 CD | 0.6 |
| Cloth | 77 | 4 | 4 | 31 MD / 20 CD | 0.1 |

$_{NPL}$=not post calendared

In summary, trends show that as the polymer thickness decreased, the tensile values also decreased slightly. Porosities were also affected by the amount of polymer used in the construction. As the polymer decreases in thickness, the porosity generally increases or decreases in seconds). Polymers such as the Kraton are relatively nonporous at all thicknesses since Kraton is not an oxygen permeable material. Composites in which the polymer's thickness is around 25 microns or below usually are relatively porous. However, at these thicknesses, there is too little polymer to bind the crossover points of the cloth and to create a barrier for the adhesive. In that case the composite usually displays holes which results in relatively porous constructions with lower tensile strengths.

Tear was greatly affected by the amount of polymer in the composites. Generally, most of the composites showed good tear properties if the thickness of the polymer was between 37 and 75 microns. Composites comprised of polymers at thicknesses below about 37 microns generally display poor tear (See, e.g. samples 2L, 2DD, 2NN, 2QQ ). Finally, the polymer type and thickness affected the drape or conformability of the construction. The polymers at thicknesses of 50 to 75 microns had high drape or handle-o-meter results. In the examples above, values ranged from 400–30. In order to reduce damage to the skin and achieve a soft feel, ranges between 60–30 are desirable. Some of the above samples displayed drape values acceptable for use in tape constructions.

Example 3

Example 3 illustrates that different adhesives are useful in woven cloth adhesive tape constructions of the present invention. Additionally, Example 3 illustrates that different methods of coating the adhesive to the polymer/cloth composite are useful in preparing tape constructions of the invention.

Backing Preparation

The cloth/polymer composite comprised of ENGAGE™ 8200 (a polyolefin available from Dow Plastics Co. of Midland, Mich.) extrusion coated onto 44×36 woven cloth (available from Burcott Mills). White backing was produced by dry blending 1 part of 50:50 titanium dioxide in low density polyethylene (available as PWC0000 1 from Reed Spectrum, Holden, Mass.) with 3 parts ENGAGE™ 8200; forming pigmented pellets by melt mixing the blend in a 40 mm twin screw extruder (available from Berstorff of Charlotte, N.C.) of 200° C. and extruding and pelletizing the strands; dry blending the pigmented pellets with more unpigmented ENGAGE™ 8200 in a ratio of 1:25; melt mixing the blend and feeding the blend at approximately 270 g/min into the feed throat of a 6.35 cm diameter Davis Standard Model #N9485 single screw extruder (available from Davis Standard, Paucatuck, Conn.) at 204° C. and extruding a 65.0 micron thick film onto the cloth with the cast roll temperatures set at 93° C. to form a laminate; and passing the laminate through the nip of two horizontal rolls at pressures of 17.7 N per lineal cm (200 pound per in) at approximately 1.1 m/min. This cloth/polymer composite was tested for tear and had excellent tear properties designated as "5."

Acrylic Pressure Sensitive Adhesive Preparation

An acrylic pressure sensitive adhesive (designated hereafter as "acrylic adhesive") was prepared in accordance with U.S. Pat. No. 4,833,179 (Young, et al.) in the following manner: A two liter split reactor equipped with condenser, thermowell, nitrogen inlet, stainless steel motor-driven agitator, and a heating mantle with temperature control was charged with 750 g deionized water, to which was added 2.5 g of zinc oxide and 0.75 g hydrophilic silica (CAB-O-SIL™ EH-5, available from Cabot Corp.,of Tuscola, Ill.) and was heated to 55 degrees C. while purging with nitrogen until the zinc oxide and silica were thoroughly dispersed. At this point, a charge of 480 g isooctyl acrylic, 20 g methacrylic acid, 2.5 g initiator (VAZO™) 64, available from duPont Co.) and 0.5 g isooctyl thioglycolate chain transfer agent was then added to the initial aqueous mixture while vigorous agitation (700 rpm) was maintained to obtain a good suspension. The reaction was continued with nitrogen purging for at least 6 hours, during which time the reaction was monitored to maintain a reaction temperature of less than 70 degrees C. The resulting pressure-sensitive adhesive was collected and mechanically pressed to at least 90% solids by weight.

3A. Hot Melt Acrylic/Thermoplastic Elastomer (TPE) Adhesive Blends

An adhesive containing a blend of an acrylic adhesive (described above) and thermoplastic elastomeric adhesive was prepared by melt blending the acrylic adhesive with a thermoplastic elastomer adhesive (prepared by preblending 50 parts thermoplastic elastomeric block copolymer KRATON™ D1107P available from Shell Chemical Co. of Houston, Tex., 1.0 parts antioxidant IRGANOX™ 1076, available from Ciba-Geigy of Hawthorne, N.Y. and 50 parts tackifying resin ESCOREZ™ 1310 LC available from Exxon Chemicals of Houston, Tex.) at ratios shown in the table below by drum unloading the pre-compounded thermoplastic elastomeric adhesive into an 8.9 cm diameter screw pin barrel mixer, available from The French Oil Mill Machinery Co., Piqua, Ohio, with zone temperatures maintained between 106° C. and 144° C. Water was injected at 1 part per 100 parts pressure-sensitive adhesive composition as the composition leaves the pin barrel mixer. A gear pump attached to the output end of the pin barrel mixer by a heated pipe delivered the pressure-sensitive adhesive composition to a wipe-film coating die, maintained at a temperature of 160° C., at 0.63 Kg/hour/cm die width onto the polymer/cloth composite described above. The backing samples were coated with adhesive at thicknesses of 50, 57 and 64 micrometers and the effect of adhesive coating weight was examined. 3M Brand Cloth Adhesive Tape available from 3M of St. Paul, Minn. and Zonas Porous brand tape available from Johnson & Johnson Medical, Inc. of Arlington, Tex. were used as Competitive Samples. The resulting tape samples and the competitive tapes were measured for adhesion to steel, adhesive adhesion to backing, tensile strength, porosity and moisture vapor transmission rate as described above. Results are shown in Table 6 below:

TABLE 6

| Sample # | Acrylic/TPE ratio (by weight) | Coating Thickness (microns) | Adh to Steel (N/dm) | Unwind (N/dm) | Wet T0 | T0 (N/dm) | T48 (N/dm) | Lift (1–5) | Residue (1–5) |
|---|---|---|---|---|---|---|---|---|---|
| 3A | 100/0 | 50 μm | — | — | — | — | — | — | — |
| 3B | 75/25 | 50 μm | 27 | — | — | — | — | — | — |
| 3C | 50/50 | 50 μm | 34 | 6 | 2.3 | 1.5 | 3.7 | 1.1 | 0.3 |
| 3D | 25/75 | 50 μm | 38 | 5 | 2.1 | 2.0 | 2.2 | 2.9 | 0.0 |
| 3E | 20/80 | 50 μm | 38 | 2 | 2.2 | 2.3 | 1.5 | 2.9 | 0.0 |
| 3F | 0/100 | 50 μm | 40 | 3 | 1.8 | 1.5 | 2.3 | 3.9 | 0.4 |
| 3G | 100/0 | 50 μm | — | — | — | — | — | — | — |
| 3H | 75/25 | 57 μm | 27 | — | — | — | — | — | — |
| 3I | 50/50 | 57 μm | 25 | — | — | 1.8 | 3.4 | 1.5 | 0.2 |
| 3J | 25/75 | 57 μm | 36 | — | — | 2.0 | 1.4 | 3.1 | 0.0 |
| 3K | 20/80 | 57 μm | 34 | — | — | 2.1 | 2.0 | 2.6 | 0.0 |
| 3L | 0/100 | 57 μm | 42 | — | — | 1.3 | 1.1 | 5.0 | 0.0 |
| 3M | 100/0 | 64 μm | — | — | — | — | — | — | — |
| 3N | 75/25 | 64 μm | 32 | — | — | — | — | — | — |
| 3O | 50/50 | 64 μm | 38 | — | 2.8 | 1.8 | 3.2 | 2.0 | 0.3 |
| 3P | 25/75 | 64 μm | 40 | — | 2.1 | 1.9 | 1.8 | 3.6 | 0.0 |
| 3Q | 20/80 | 64 μm | 41 | — | 2.1 | 2.0 | 2.0 | 2.4 | 0.0 |
| 3R | 0/100 | 64 μm | 42 | — | 1.7 | 1.9 | 2.6 | 4.0 | 0.0 |
| 3M Brand | control | — | 13 | 96 | 3.6 | 1.2 | 4.1 | 1.4 | 0.8 |
| J & J Zonas Porous | control | — | 12 | 14 | 2.2 | 0.9 | 3.3 | 1.6 | 0.5 |

3B. Solvent Coated Acrylic/Thermoplastic Elastomer Adhesive Blends

An adhesive containing a blend of an acrylic adhesive and thermoplastic elastomeric adhesive was prepared by dissolving the acrylic adhesive (described above) in a heptane/isopropyl alcohol 90/10 mix at 25% solids in a 3.8 liter glass jar. The thermoplastic elastomer (KRATON™ 1107) was tackified using ESCOREZ™ 1310LC so that a 50:50 ratio was obtained. The KRATON™/tackifier composition was dissolved in toluene at 50% solids in a 3.8 liter glass jar. Each batch solution was mixed on a roll mixer overnight at room temperature (25 degrees C.). Various blend ratios were prepared by combining the appropriate amounts acrylic adhesive and KRATON™ adhesive in 0.9 liter glass jars, sealed with lids and allowed to mix on a roll mixer overnight at room temperature.

The adhesives were coated on the cloth/polymer composites described above varying percent solids to produce coatings with a thickness of 32 micrometer. The coating was accomplished with a 25.4 cm wide knife coater at several different coating gaps depending on the percent solids of the blends. Processing conditions are shown in Table 7 below.

TABLE 7

| Sample # | Acrylic/ Thermoplastic Elastomer ratio | % Solids | Ctg Orifice (microns) | Ctg Thickness (micrometer) | Speed (m/min.) |
|---|---|---|---|---|---|
| 3S | 0:100 | 50.0% solids | 100 | 32 | 1.4 |
| 3T | 25:75 | 43.8% solids | 100 | 32 | 1.4 |
| 3U | 50:50 | 37.5% solids | 100 | 32 | 1.4 |
| 3V | 75:25 | 31.3% solids | 135 | 32 | 1.4 |
| 3W | 100:0 | 25.0% solids | 218 | 32 | 1.4 |
| 3X | 10:90 | 47.4% solids | 100 | 32 | 1.3 |
| 3Y | 90:10 | 27.5% solids | 350 | 32 | 1.5 |

The coated samples were then subjected to a dual oven system to remove the solvent in the adhesives. The first oven temperature was at 37.7 degrees C. while the second oven was at 135 degrees C. A liner (Daubert) was inserted before wind-up to ensure the adhesives on the samples would not block on the uncoated backing surface before testing was complete. The resulting tape samples were measured for adhesion to steel, adhesive adhesion to backing, tensile strength, porosity and moisture vapor transmission rate as described above. Additionally, Zonas Porous brand tape available from Johnson & Johnson Medical, Inc. of Arlington, Tex. and 3M brand Cloth Adhesive Tape available from 3M of St. Paul, Minn. were tested for the same properties for comparative purposes. Results are shown in Table 8 below:

TABLE 8

| Sample | Adhesion to Steel (N/dm) | Adhesion to backing (N/dm) | Tensile (N) | Elongation | 2 Bond (N/dm) | Porosity (seconds) | MVTR g/m²/day | T0 (N/dm) | T48 (N/dm) | Lift | Residue |
|---|---|---|---|---|---|---|---|---|---|---|---|
| 3S | 14 | 3 | 120 N | 4% | — | >300 | 63 g/m2/day | 1.8 | 0 | 5.2 | 0.3 |
| 3T | 12 | 2 | 127 N | 4% | 69 | >300 | 103 g/m2/day | 1.8 | 0 | 4.7 | 0.0 |
| 3U | 8 | 4 | 109 N | 4% | 61 | >300 | 134 g/m2/day | 2.1 | 2.7 | 1.5 | 1.0 |
| 3V | 7 | 3 | 109 N | 4% | 35 | >300 | 134 g/m2/day | 2.0 | 3.9 | 1.5 | 2.0 |
| 3W | 7 | 5 | 123 N | 4% | 9 | >300 | 174 g/m2/day | — | — | — | — |
| 3X | 20 | 6 | 121 N | 5% | — | >300 | 55 g/m2/day | 2.6 | 0.5 | 4.8 | 0.0 |
| 3Y | 14 | 7 | 125 N | 4% | 37 | >300 | 134 g/m2/day | 2.9 | 5.6 | 1.1 | 2.4 |
| J & J Zonas | 12 | 11 | 190 N | 7% | 136 | 4.8 | 3784 g/m2/day | 1.4 | 2.0 | 2.4 | 0.3 |
| 3M Brand | 23 | 35 | 151 N | 5% | 125 | 28.5 | 830 g/m2/day | — | — | — | — |

3C. Hot Melt Acrylic/Thermoplastic Elastomer/Filler Blend Adhesive

An adhesive containing an acrylic adhesive (described above), thermoplastic elastomeric adhesive, and filler were melt blended in a twin screw extruder fitted with a screw suitable for thermoplastic elastomers and hot melt coated directly onto the cloth/polymer laminate. The blend containing an acrylic adhesive/thermoplastic elastomer/tackifying resin/filler at 60/20/20/11.1 parts respectively was prepared by feeding KRATON™ D1107 pellets (Shell Chemical) into Barrel 1 of a 30 mm ZSK 30 Werner-Pfleiderer twin screw extruder, adding a tackifier/filler powder mixture of ESCOREZ™ 1310 LC (Exxon Chemical) and alumina trihydrate (Micral 1500 grade from Solex Industries, Norcross, Ga.) at a ratio 1.8:1 into Barrel 3 of the extruder and feeding the acrylic adhesive (prepared as described above) into Barrel 8 of the twin screw extruder. The blend was compounded in the extruder at 149 degrees C. at rpm of approximately 400, passed through a screen filter and gear pump located at the end of the extruder at 166 degrees C. and delivered by a heated pipe to a wipe-film coating die maintained at 166 degrees C. Extruder outputs were approximately 2.0 Kg/hr/14 cm die width. The adhesive coating had an average thickness of approximately 50 micrometers.

The 30 mm ZSK 30 Werner-Pfleiderer twin screw extruder with a 45:1 L/D was used consisting of 15 barrel section and controlled by 6 zone heaters. The extruder configuration and processing conditions were as follows:

| Zone 1 | Zone 2 | Zone 3 | Zone 4 | Zone 5 | Zone 6 |
|---|---|---|---|---|---|
| Barrels 1–3 | Barrels 4–6 | Barrels 7–8 | Barrels 9–10 | Barrels 11–13 | Barrels 14–15 |
| 52 degrees C. | 135 degrees C. | 149 degrees C. | 149 degrees C. | 149 degrees C. | 149 degrees C. |

The samples were tested for their adhesion to steel, adhesion to backing, unwind, initial adhesion to skin and after 48 hours, lift and residue. Results are shown in Table 9 below.

TABLE 9

Hot Melt Acrylic/TPE Filler Properties

| Sample | Adh steel N/dm | Adh backing N/dm | Unwind N/dm | T0 N/dm | T48 N/dm | Lift | Residue |
|---|---|---|---|---|---|---|---|
| 3C | 25 | 12 | 9 | 1.0 | 3.1 | 1.0 | 0.0 |

Example 4

Example 4 demonstrates that adhesives comprised of acrylic adhesive and elastomer blends which are hot melt coated or solvent coated onto the composite backing are useful in preparing tapes according to the invention.

Backing Preparation

The cloth/polymer composite comprised of ENGAGE™ 8200 (a polyolefin available from Dow Plastics Co.) was extrusion coated onto 44×36 woven cotton cloth (available from Burcott Mills). White backing was produced by dry blending 1 part of 50:50 titanium dioxide in low density polyethylene (available as PWC00001 from Reed Spectrum, Holden Mass.) with 3 parts ENGAGE™ 8200; forming pigmented pellets by melt mixing the blend in a 40 mm twin screw extruder (available from Berstorff) at 200° C. and extruding and pelletizing the strands; dry blending the pigmented pellets with more unpigmented ENGAGE™ 8200 in a ratio of 1:25; melt mixing the blend and feeding the blend at approximately 270 g/min into the feed throat of a 6.35 cm diameter Davis Standard Model #N9485 single screw extruder (available from Davis Standard, Paucatuck, Conn.) at 204° C. and extruding a 65.0 micron thick film onto the cloth with the cast roll temperatures set at 93° C. to form a laminate; and passing the laminate through the nip of two horizontal rolls at pressures of 350 N per lineal cm (200 pound per in) at approximately 1.1 m/min. The composite demonstrated excellent tear properties when the hand tear test was used.

The acrylic adhesive used to prepare the adhesive blends for samples of Example 4A, 4B and 4C is described in Example 3 above.

4A. Hot Melt Acrylic/Elastomer Adhesive Blends

The acrylic/elastomer adhesive blends were prepared in a Werner-Pfleiderer ZSK 30 mm twin screw extruder with a 37:1 L/D equipped with a Zenith pump for metering. Samples 4A–4H were prepared by feeding the elastomer into barrel 2 of the extruder. In barrek 1, the tackifiers were added. Into barrel 6, the acrylic adhesive described above was added. Samples 4I–4L were prepared by feeding the elastomeric Vistanex™ MML-80 into barrel 2 Vistanex™ LMMH was fed into zone 2 of the extruder. In zone 4, the tackifiers were added into barrel 6, the acrylic adhesive described above was added. Samples 4M–4P were prepared by feeding the elastomer into barrel 2 of the extruder. Into barrel 2, the Ameripol™ block copolymer was added. Into barrel 4, the tackifers were added. Into barrel 6, the acrylic adhesive described above was added.

The adhesive blends were coated onto the backing described above using a 14 cm wiping die at web speeds between 6.8–12.8 m/min to achieve the target coating thickness of 50 microns. Extruder speeds on the twin screw extruder were held at 200 rpm. Overall now rates were kept in the 4.9–9.1 kg/hr range.

Process temperatures for the blends were:

TABLE 10

| Sample | Zone 1 | Zone 2 | Zone 3 | Zone 4 | Zone 5 | Zone 6 | Die |
|---|---|---|---|---|---|---|---|
| 4A-4D | 163 degrees C. | 174 degrees C. | 175 degrees C. | 177 degrees C. | 176 degrees C. | 177 degrees C. | 177 degrees C. |
| 4E-4H | 149 degrees C. | 161 degrees C. | 163 degrees C. | 163 degrees C. | 163 degrees C. | 163 degrees C. | 163 degrees C. |
| 4I-4L | 149 degrees C. | 175 degrees C. | 204 degrees C. | 204 degrees C. | 198 degrees C. | 207 degrees C. | 204 degrees C. |
| 4M-4P | 83 degrees C. | 89 degrees C. | 94 degrees C. | 94 degrees C. | 94 degrees C. | 94 degrees C. | 106 degrees C. |

3M Brand Cloth Adhesive tape was used as a competitive tape. Samples and the control were tested for adhesion to steel, adhesion to backing, 2-Bond, 5-Bond, Initial Adhesion ($T_0$) and Adhesion after 48 hours ($T_{48}$) with results shown in Table 11 below.

TABLE 11

| Sample | Acrylic/Elastomer ratio | Adhesion to Steel (N/dm) | Adhesion to backing (N/dm) | 2-Bond (% Transfer) | 5-Bond (min.) | Wet T0 N/dm | To (N/dm) | T48 (N/dm) | Lift | Residue | Unwind |
|---|---|---|---|---|---|---|---|---|---|---|---|
| 4A | 0/100[1] | 28 | 13 | 75% transfer | 0.4 min. | 3.4 | 4.6 | 3.5 | 1.4 | 2.0 | — |
| 4B | 25/75[1] | 22 | 6 | 100% | 0.9 | 2.3 | 1.9 | 1.9 | 2.6 | 1.3 | — |
| 4C | 50/50[1] | 33 | 11 | 100% | 0.4 | 2.7 | 3.1 | 4.6 | 1.0 | 2.3 | 34 |
| 4D | 75/25[1] | 37 | 9 | 100% | 0.2 | 3.1 | 4.1 | 6.2 | 0.8 | 3.7 | — |
| 4E | 0/100[2] | 22 | 2 | 75% | 0.2 | 1.6 | 1.7 | 1.9 | 1.2 | 0.3 | 61 |
| 4F | 25/75[2] | 48 | 6 | 75% | 0.2 | 3.2 | 3.2 | 3.4 | 1.4 | 1.3 | 72 |
| 4G | 50/50[2] | 51 | 11 | 90% | 0.3 | 3.8 | 3.5 | 5.3 | 1.3 | 1.8 | 46 |
| 4H | 75/25[2] | 48 | 13 | 100% | 0.2 | 4.4 | 3.3 | 6.5 | 0.6 | 2.5 | 34 |
| 4I | 0.100[3] | 35 | 3 | 100% | 2.9 | 1.5 | 1.3 | 0.0 | 5.1 | 0.0 | — |
| 4J | 25/75[3] | 41 | 5 | 100% | 2.1 | 1.9 | 1.8 | 1.4 | 2.3 | 0.1 | — |
| 4K | 50/50[3] | 43 | 6 | 100% | 0.6 | 2.6 | 2.2 | 2.9 | 1.4 | 0.5 | 59 |
| 4L | 75/25[3] | 40 | 10 | 100% | 0.3 | 3.1 | 2.6 | 5.4 | 0.8 | 1.2 | — |
| 4M | 0/100[4] | 49 | 5 | 100% | 0.3 | 3.5 | 4.0 | 2.4 | 2.0 | 3.0 | — |
| 4N | 25/75[4] | 19 | 11 | 100% | 0.1 | 1.7 | 2.5 | 3.0 | 1.2 | 3.7 | — |
| 4O | 50/50[4] | 22 | 13 | 100% | 0.1 | 1.7 | 2.8 | 4.6 | 0.7 | 3.6 | 16 |
| 4P | 75/25[4] | 24 | 13 | 100% | 0.1 | 2.1 | 3.8 | 5.4 | 1.2 | 4.6 | 16 |
| Control | Natural Rubber. | 21 | NA | 35% | 5.7 | 3.6 | 0.9 | 4.6 | 1.1 | 1.0 | 14 |

[1] Natsyn ™ 2210 (polyisoprene), Wingtack ™ 95 (tackifier) at 100 parts/70 parts respectively;
[2] Natsyn ™ 2210, Vistanex ™ LMMH (polyisobutylene) at 100 parts/167 parts respectively
[3] Vistanex ™ MML80, Wingtack ™ 95, Vistanex ™ LMMH at 100 parts/32 parts/48 parts respectively.
[4] Ameripol ™ 1011A (Styrene-butadiene elastomer), Foral ™ 85 (tackifier) at 100 parts/100 parts respectively.

The data shows that both adhesion to steel and skin can be manipulated by altering the relative amounts of acrylic adhesive, elastomer and tackifier, as well as the type of elastomer.

4B Solvent Coated Acrylic/Elastomer Blend Adhesive Composite Backing Preparation Example 4B demonstrates that acrylicte/astomer adhesive blends which are solvent coated onto a composite backing are useful in preparing tapes according to the invention. The cloth/polymer composite backing used in this Example was prepared as explained in Example 3 above.

Solvent coated adhesive tape samples were generated in the following manner. The solvent borne adhesive blends were prepared by dissolving the acrylic adhesive (described above) in a toluene/heptane 90/10 mix at 20% solids in a 3.8 liter glass jar. The Natsyn™ 2210/Vistanex™ LMMH (100 parts/167 parts) compositions were dissolved in heptane at 20% solids in a one gallon (3.8 liter) glass jar using a lightening mixer for 24 hrs. Both master batch solutions were then mixed on a roll mixer for 24 hrs at room temperature. The various blend ratios were prepared in similar fashion as the master batches. The appropriate amounts acrylic adhesive and elastomer blend at that given adhesive ratio were weighed in 16 oz. (0.9 liter) glass jars, sealed with lids and allowed to mix on a roll mixer overnight at room temperature (25 degrees C.).

TABLE 12

| Sample | Backing | Adhesive Acrylic/Elastomer ratio | Orifice (mil) (microns) | Coating Thickness (micrometers) | Speed (m/min.) | Zone 1 Temp. (C.) | Zone 2 Temp. (C.) | Adhesion to Steel (N/dm) | $T_0$ (N/dm) | $T_{48}$ (N/dm) | Lift | Residue |
|---|---|---|---|---|---|---|---|---|---|---|---|---|
| 4Q | Cloth/Polymer | 100/0 @ 20% solids | 386 | 50.7 | 1.1 | 37 | 135 | — | 2.0 | 9.5 | 0.2 | 0.4 |
| 4R | Cloth/Polymer | 0/100 @ 20% solids | 312 | 50.0 | 1.1 | 37 | 135 | 9 | 1.5 | 1.4 | 0.7 | 0.7 |
| 4S | Cloth/Polymer | 25/75 @ 20% solids | 312 | 50.0 | 1.1 | 37 | 135 | 28 | 2.0 | 2.8 | 0.8 | 0.4 |
| 4T | Cloth/Polymer | 50/50 @ 20% solids | 368 | 51.8 | 1.1 | 37 | 135 | 23 | 2.0 | 6.0 | 0.7 | 0.5 |
| 4U | Cloth/Polymer | 75/25 @ 20% solids | 380 | 51.1 | 1.1 | 37 | 135 | 21 | 2.2 | 7.5 | 0.6 | 0.5 |

4C Hot Melt Acrylic/Elastomer/Filler

An adhesive containing an acrylic pressure sensitive adhesive, elastomeric adhesive and filler were melt blended in a twin screw extruder and hot melt coated directly onto the cloth/polymer laminate. The blend containing the acrylic/elastomer/tackifying resin/Zinc oxide/Alumina trihydrate at 50/18.75/31.25/2/10 parts respectively was prepared by feeding NATSYN™ 2210 pellets (Goodyear Tire and Rubber Company) into barrel 1 of a 30 mm Werner-Pfleiderer twin screw extruder (45:1 L:D) adding a premix of the Zinc oxide(KADOX™ 911C, from Zinc Corporation of America, Monaca, Pa.)/Alumina trihydrate ( Micral 1500 grade from Solex Industries, Norcross, Ga.) into barrel 3, adding the VISTANEX™LMMH into barrel 5 of the extruder and feeding the acrylic adhesive into barrel 8 of the twin screw extruder. The blend was compounded in the extruder at 149 degrees C. at rpm of approximately 425, passed through a screen filter and gear pump located at the end of the extruder at 166 degrees C. and delivered by a heated pipe to a wipe-film coating die maintained at 166 degrees C. Extruder outputs were approximately 2.0 kg/hr/14 cm die width. The adhesive coating had an average thickness of approximately 50 µm (2 mils).

Process Conditions for Sample 4V were as follows:

| Zone 1 | Zone 2 | Zone 3 | Zone 4 | Zone 5 | Zone 6 |
|---|---|---|---|---|---|
| Barrels 1–3 | Barrels 4–6 | Barrels 7–8 | Barrels 9–10 | Barrels 11–13 | Barrels 14–15 |
| 52 degrees C. | 135 degrees C. | 149 degrees C. | 149 degrees C. | 149 degrees C. | 166 degrees C. |

Sample 4V was tested for adhesion properties and results are shown in Table 13 below.

TABLE 13

| Sample | Adh steel N/dm | Adh back N/dm | Unwind N/dm | T0 N/dm | T48 N/dm | Lift | Residue |
|---|---|---|---|---|---|---|---|
| 4V | 5.9 | 4.0 | 13.3 | 2.1 | 3.8 | 0.8 | 0.2 |
| ZONAS Porous | 13.0 | 15.6 | 14.3 | 1.9 | 3.7 | 1.2 | 0.1 |

Example 5

Example 5 illustrates that tape constructions of the invention can be embossed to improve porosity and moisture vapor transmission rates without unduly decreasing adhesion of the tape to steel or skin.

Samples generated in Example 3B above was embossed in order to perforate the tape. Five foot sections of each sample was placed on a release liner and run through a calender stack at 90.5 degrees C. under 120 pli (210 N per lineal cm) at 9.45 m/min. using a roller having a raised square pyramidal pattern with 97 holes per square centimeter. 3M Brand Cloth Adhesive tape and Zonas Porous Brand tape were used as control tapes. The perforated samples and control tapes were then tested for adhesion to steel, adhesion to backing, tensile strength, elongation, 2-Bond, porosity and moisture vapor transmission rate with results shown in Table 14 below.

TABLE 14

Physical properties of embossed sample.

| Sample | Adh to Steel (N/dm) | Adh to backing (N/dm) | Tensile (N) | Elongation | 2 Bond (N/dm) | Porosity (sec.) | MVTR (g/m²/day) |
|---|---|---|---|---|---|---|---|
| 5-3S | 4 | 2 | 125 | 5% | 11 | 0.4 | 5135 |
| 5-3T | 5 | 2 | 122 | 5% | 47 | 0.6 | 4487 |
| 5-3U | 28 | 5 | 155 | 5% | — | 92.3 | 181 |
| 5-3V | 7 | 1 | 66 | 5% | 67 | 2.4 | 2994 |
| 5-3W | 5 | 2 | 124 | 5% | — | 2.3 | 3028 |
| 5-3X | 8 | 3 | 122 | 5% | 51 | 0.6 | 4764 |
| 5-3Y | 12 | 4 | 114 | 4% | — | 3.0 | 2718 |
| 5-4A | 12 | 30 | 125 | 5% | 79 | 3.0 | 2451 |
| 5-4B | 1 | 3 | 128 | 5% | NA | 3.0 | 3029 |
| 5-4C | 16 | 4 | 128 | 5% | NA | 3.0 | 1888 |
| 5-4D | 14 | 3 | 101 | 4% | NA | 1.0 | 2813 |
| 5-4E | 7 | 2 | 115 | 6% | NA | 20.0 | 2135 |
| 5-4F | 16 | 2 | 119 | 6% | NA | 6.0 | 956 |
| S-4G | 28 | 3 | 121 | 5% | NA | 3.0 | 2582 |
| 5-4H | 24 | 3 | 117 | 5% | NA | 4.0 | 2120 |
| 5-4I | 13 | 1 | 123 | 6% | NA | 96.0 | 979 |
| 5-4J | 19 | 1 | 118 | 5% | NA | 8.0 | 1326 |
| 5-4K | 18 | 2 | 123 | 5% | NA | 4.0 | 2050 |
| 5-4L | 18 | 2 | 123 | 5% | NA | 3.0 | 2035 |
| 5-4M | 16 | 3 | 116 | 5% | NA | 1.0 | 3707 |
| 5-4N | 66 | 3 | 118 | 5% | NA | 1.0 | 3453 |
| 5-4O | 27 | 3 | 114 | 5% | 28 | 1.0 | 4224 |
| 5-4P | 27 | 3 | 114 | 6% | 28 | 3.0 | 2929 |
| Control 3M Brand | 25 | 36 | 149 | 5% | 125 | 37.0 | 3831 |

TABLE 14-continued

Physical properties of embossed sample.

| Sample | Adh to Steel (N/dm) | Adh to backing (N/dm) | Tensile (N) | Elongation | 2 Bond (N/dm) | Porosity (sec.) | MVTR (g/m$^2$/day) |
|---|---|---|---|---|---|---|---|
| Control J & J Zonas Porous | 13 | 15 | 186 | 7% | 113 | 2.0 | 779 |

The tape samples showed a decrease in adhesion properties after embossing. This indicates that the temperature/pressure profiles for embossing affected the overall adhesion of the samples. The possible causes include detackification due to polymer degradation, or contamination from the release liner. In either case, the embossing step did not affect the tensile or elongation properties of the backing and enhanced the porosity and MVTR properties as compared to unembossed Example 8B.

Embossing lowered the adhesive properties of the samples without affecting the tensile strength or elongations of the backings. Improvements in the porosity and the moisture vapor transmission rate of the overall construction was observed.

Example 6

Example 6 shows that adhesives used to make an embodiment of the invention can be cross-linked using electron beams.

Composite backings were prepared according to the protocol described in Example 3. The backings were coated with adhesives as described in Example 4A. Some of the samples were embossed as described in Example 5.

Samples which contained elastomer/tackifier pressure-sensitive adhesives comprised of either Natsyn™ 2210/Wingtack™ 95 (Samples 6A–6E) or Ameripol™/Foral™ 85 (Samples 6F–6J) with respective ratios given in the table below with and without embossing were irradiated using a Lab Unit Electrocurtain Model # CB175, Serial # 7521 made by Energy Sciences of Wilmington, Mass. Samples were treated at 0, 2, and 4 Mrad at 175 kv using 1 pass at 3.8 m/min by adhering the samples to a polyester carrier web with the adhesive side exposed. The samples were irradiated and immediately contacted with a release liner. Each sample was tested for adhesion of the adhesive to steel, adhesion of the adhesive to backing, down-web direction tensile strength, elongation, 2 bond, porosity, and moisture vapor transmission rate. Results are shown in Table 15 below.

TABLE 15

| Sample | Acrylic/Elastomer Ratio | E-beam Dosage/ Embossing | Adh to Steel (N/dm) | Adh to backing (N/dm) | Tensile (N) | Elongation | 2 Bond (N/dm) | Porosity (sec.) | MVTR (g/m$^2$/day) |
|---|---|---|---|---|---|---|---|---|---|
| 6A | 0/100[1] | 2 Mrad no embossing | 22 | 10 | 119 | 5% | 46 | >300 | 53 g/m2/day |
| 6B | 0/100[1] | 4 Mrad no embossing | 25 | 14 | 110 | 5% | 43 | >300 | 45 |
| 6C | 0/100[1] | 0 Mrad embossed | 17 | 28 | 94 | 5% | 81 | 1.4 | 2656 |
| 6D | 0/100[1] | 2 Mrad embossed | 17 | 23 | 117 | 5% | 57 | 1.5 | 3679 |
| 6E | 0/100[1] | 4 Mrad embossed | 12 | 17 | 109 | 5% | 48 | 0.9 | 3830 |
| 6F | 0/100[2] | 2 Mrad no embossing | 33 | 4 | 113 | 6% | 42 | >300 | 68 |
| 6G | 0/100[2] | 4 Mrad no embossing | 25 | 4 | 95 | 4% | 44 | >300 | 68 |
| 6H | 0/100[2] | 0 Mrad embossed | 19 | 3 | 102 | 5% | — | 1.4 | 3551 |
| 6I | 0/100[2] | 2 Mrad embossed | 21 | 4 | 113 | 5% | — | 1.6 | 3747 |
| 6J | 0/100[2] | 4 Mrad embossed | 17 | 3 | 94 | 4% | — | 1.7 | 3995 |
| Zonas Porous | Natural Rub. | NA | 12 | 10 | 179 | 8% | 112 | 2.3 | 3310 |
| 3M Brand | Natural Rub | NA | 18 | 34 | 136 | 7% | 124 | 106.3 | 609 |

[1]Natsyn ™ 2210/Wingtack ™ 95 100 parts Natsyn/70 parts Wingtack
[2]Ameripol ™/Foral ™ 85 100 parts Natsyn/100 parts Wingtack Only slight changes in the adhesion to steel and adhesion to backing numbers were observed after irradiating the samples. These changes are not considered critical.

Example 7

Hot Melt Tackified Acrylic

An adhesive containing an acrylic pressure sensitive adhesive (described in Examples 3 and 4) and tackifying resin were melt blended in a twin screw extruder and hot melt coated directly onto the cloth/polymer laminate. The blend containing an acrylic adhesive/tackifying resin at 90/10 parts respectively was prepared by feeding acrylic adhesive in barrel 1 of a 30 mm Werner-Pfleiderer ZSK 30 twin screw extruder, adding a tackifier of ESCOREZ™ 1310 LC (Exxon Chemical) in barrel 1 of the extruder. The blend was compounded in the extruder at 149 degrees C. at rpm of approximately 325, passed through a screen filter located and respective gear pump at 166 degrees C. and delivered by a heated pipe to a wipe-film coating die maintained at 166 degrees C. Extruder outputs were approximately 3.6 Kg/hr/14 cm die width. The adhesive coating had an average thickness of approximately 50 microns (2 mils). The hot melt/tackified adhesives were tested and results are shown in Table 16 below.

TABLE 16

Hot Melt Tackified Acrylic Properties

| Sample | Adh to steel (N/dm) | Adhesion to backing (N/dm) | Unwind (N/dm) |
|---|---|---|---|
| 7A | 23 | 23 | 34 |

Example 8

This example demonstrates that different adhesives coated from solvent are useful in preparing tapes of the invention.

An acrylic-based adhesive containing iso-oytylacrylic/acrylic acid/styrene macromer at ratios of 96/2/2 at 50% solids in ethyl acetate was coated onto cloth/polymer composite samples created in Example 3 above. The same procedure and equipment as in Example 3B was used to coat the adhesive. The processing conditions are listed in Table 17 below.

TABLE 17

Processing Conditions

| Sample # | Backing | Adhesive % Solids | Coating Orifice | Coating Thickness | Speed |
|---|---|---|---|---|---|
| 8A | Cloth/Polymer | 50.0% solids | 125 microns | 42.9 micrometer | 1.8 m/min. |

The adhesive-coated samples were then tested for adhesion of the tape to steel, adhesion of the adhesive to backing, web direction tensile strength, elongation, 2 bond, porosity, and moisture vapor transmission rate. Results are shown in Table 18 below.

TABLE 18

| Sample | Adhesion to Steel (N/dm) | Adhesion to backing (N/dm) | Tensile (N) | Elongation | 2 Bond (N/dm) | Porosity (sec.) | MVTR |
|---|---|---|---|---|---|---|---|
| 8A | 31 | 7 | 125 | 5% | 37 | >300 | 134 g/m2/day |

In most cases, the adhesive debonded from the polymer backing when tested against another surface (steel, skin, etc.).

Example 9

This example demonstrates that a tape of the invention created by solvent-coating the adhesive to the cloth-polymer composite backing can be embossed to improve the moisture vapor transmission rate and to increase the porosity of the tape.

A five foot section of the sample generated in Example 8 was placed on a release liner. This sample was then embossed by running the sample through a calender stack at 90.5 degrees C. under 120 pli at (210 N per lineal cm). The embossed sample had 97 holes/cm$^2$ perforated area. This sample was then tested for its physical properties along with control tapes with the results shown in Table 19 below.

TABLE 19

| Sample | Adhesion to Steel (N/dm) | Adhesion to backing (N/dm) | Tensile (N) | Elongation | 2 Bond (N/dm) | Porosity (min.) | MVT |
|---|---|---|---|---|---|---|---|
| 9A | 26 | 4 | 113 | 4% | 25 | 1.1 | 3871 |
| J & J Zonas | 12 | 11 | 190 | 7%. | 136 | 4.8 | 3784 |
| 3M Brand | 23 | 35 | 151 | 5% | 125 | 28.5 | 829 |

The same trends occur with these embossed samples as with the samples in Example 5. That is, the adhesion to steel and backing decrease with embossing. However, the tensile properties of the tape did not decrease. The porosity of the tape was improved by embossing holes into the structure as evidenced by the low porosity value and high moisture vapor transmission rate.

Example 10

Example 10 demonstrates fibrous regularly spaced substrates are useful for preparing backings for the tape of the invention.

An approximately 12.7×12.7 cm square piece of CLAF® fabric backing available from Amoco Nisseki CLAF Inc of Atlanta, Ga. was placed on an approximately 12.7×12.7 square piece of 4 mil thick polymer comprised of a 10% by weight blend of Kraton 1107 and 90% by weight acrylonitrile butadiene styrene (ABS) Cycolac™ DFA 1000R available from General Electric of Pittsfield, Mass. The CLAF™ fabric backing and polymer were placed between two 25.4× 25.4 cm square chrome platen plates each having an approximate thickness of about 6400 microns. The sandwiched plates with the backing and polymer in between were then placed into a Wabash Heated Flat Platen Press available from Wabash, MPI of Wabash, Ind. which was heated to 143° C. The plates were pressed together until a pressure of about 1,362 kg was obtained and the plates were held at that pressure for about 10 seconds. After heating and applying pressure the plates were removed from the press and cooled allowing the sample to cool.

No. 4,545,843 to Bray is not a suitable method of preparing the woven cloth/polymer backing for the adhesive tape of the invention.

To the extent possible, the protocol outlined in the Bray patent was followed for preparing the comparative samples of this comparative example. Bray did not disclose the exact weave density of the fabric. Bleached cotton cheese cloth having a weave density of 44×36 threads per 2.5 cm was used for the comparative samples and for the control sample. Polymeric film comprised of ethylene acrylic acid and available as Primacor 3440 from Dow Chemical of Midland, Mich. was laminated to the cloth.

The following methods were used to laminate the film to the backing. The polymeric film and woven cloth were simultaneously passed through a nip created by a silicone cast roll and a Teflon (TM) treated steel nip roll. The silicone roll was at ambient temperature and the Teflon (TM) treated steel nip roll was heated to the temperature indicated in Table 15 below for each sample ranging from ambient temperature to 260° C. Two different methods of placing the cloth and film into the nip were used. Mode A involved placing the polymeric film against the silicone roll leaving the cloth against the nip roll. Mode B involved placing the cloth against the silicone roll leaving the film against the nip roll. The mode each sample was run at is listed in Table 20 below.

The sample backing designated as control was prepared according to the invention and is described in Example 3 above.

TABLE 20

| Sample # | Mode | (Gurley; Nip Temp (° C.) | Tear (1–5) Nip Pressure (N/lineal cm) | Film Gage (microns) | Speed (m/min) | Delaminate | Porosity seconds/5 0 cc) | Curling | 1 = POOR; 5 = GOOD Cross-Web | Down-Web |
|---|---|---|---|---|---|---|---|---|---|---|
| 11A | A | 93 | 18–140 | 25 | 1.2 | YES | — | YES | 1 | 1 |
| 11B | B | 93 | 18 | 25 | 1.2 | YES | — | YES | 1 | 1 |
| 11C | B | 93 | 140 | 25 | 1.2 | YES | >10,000 | YES | 1 | 1 |
| 11D | B | 107 | 140 | 25 | 1.2 | NO | 5 | YES | 3 | 2 |
| 11E | A | 107 | 140 | 25 | 1.2 | YES | >10,000 | YES | 1 | 1 |
| 11F | B | 107 | 140 | 25 | 9.8 | YES | >10,000 | YES | 1 | 1 |
| 11G | B | 107 | 140 | 75 | 1.2 | YES | >10,000 | YES | 1 | 1 |
| 11H | B | 250 | 140 | 25 | 1.2 | NO | 1.2 | YES | 3 | 1 |
| 11I | B | 250 | 140 | 25 | 9.8 | YES | 1698.5 | YES | 1 | 1 |
| 11J | B | 300 | 140 | 25 | 1.2 | NO | 3.8 | YES | 3 | 2 |
| 11K | B | 171 | 140 | 25 | 1.2 | NO | 1 | YES | 1 | 1 |
| 11L | B | 171 | 140 | 25 | 9.8 | YES | 4.6 | YES | 1 | 1 |
| 11M | B | 171 | 140 | 25 | 5.5 | NO | 1.1 | YES | 3 | 2 |
| 11N | B | 171 | 140 | 25 | 5.5 | NO | 820 | YES | 3 | 2 |
| 11O | B | 171 | 140 | 25 | 3.4 | NO | 2.8 | YES | 3 | 3 |
| 11P | B | 204 | 140 | 25 | 5.5 | YES/NO | 1.2 | YES | 2 | 1 |
| 11Q | B | 204 | 140 | 25 | 7.6 | YES | 1.0 | YES | 1 | 1 |
| 11R | B | 204 | 140 | 25 | 3.4 | NO | 0.6 | YES | 2 | 2 |
| 11S | B | 204 | 140 | 75 | 5.5 | YES | 325.0 | YES | 3 | 0 |
| 11T | B | 260 | 140 | 25 | 9.8 | NO | 0.3 | YES | 1 | 1 |
| 11U | B | 260 | 140 | 25 | 12.2 | YES/NO | 0.5 | YES | 1–2 | 2 |
| 11V | B | 260 | 140 | 75 | 12.2 | YES/NO | 369.3 | NO | 1–2 | 1 |
| Control | B | 200 | 140 | 75 | 9.5 | NO | >10,000 | NO | 5 | 5 |

The cooled backing composite was torn according to the hand tear test outlined above. Straight line tear was obtained in both the down-web and cross-web directions and the tear was designated a "5" according to the tear test methodology.

Comparative Example 11

This Comparative Example demonstrates that laminating a polymeric film to a woven cloth as described in U.S. Pat.

Figure 6:
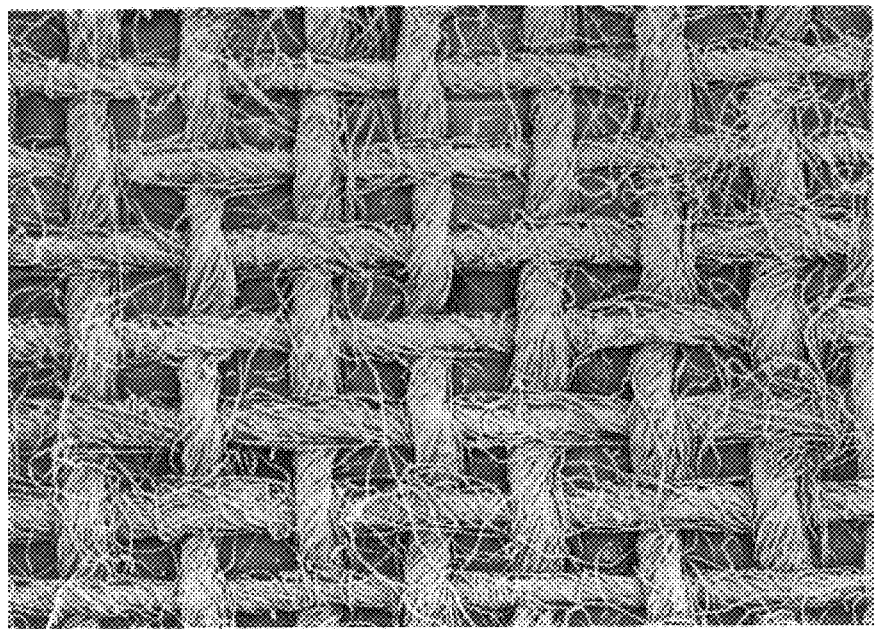
FIG. 6 is a 20 times magnification SEM of a top view of a comparative sample prepared by methods of Comparative Example 11.
Figure 7:
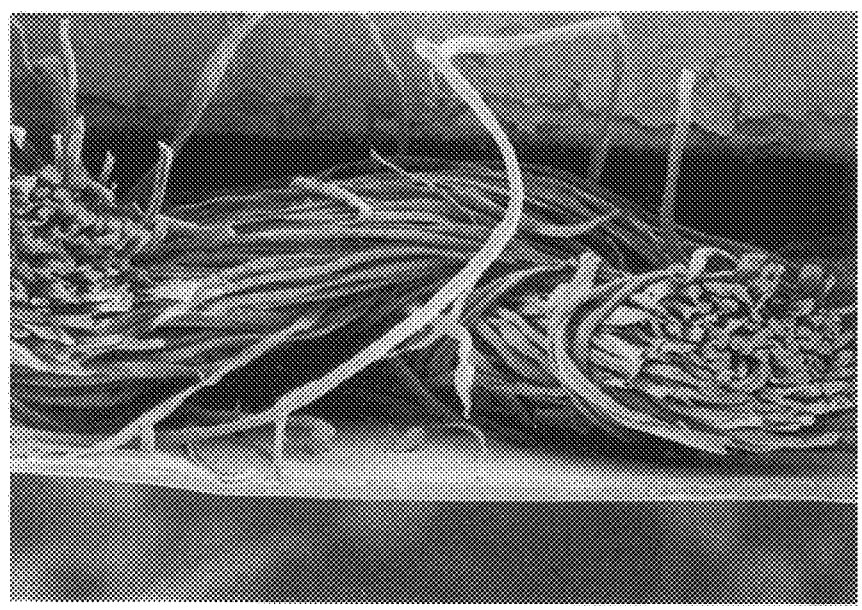
FIG. 7 is a 100 times magnification SEM cross-sectional view of the comparative sample of FIG. 6.

The Comparative Samples 11A–11V displayed unacceptable tear in the down-web and cross-web directions as compared to the Control which displayed acceptable or desirable tear properties in both directions. FIGS. 6 and 7 are top and cross sectional views respectively of sample 11O. Although the polymer did not completely encase the cloth as shown in FIG. 6, polymer 30 is not embedded into the cloth fibers 32 so as to bind the crossover points of the warp and weft threads of the woven cloth (FIG. 7).

Some processing problems were encountered when practicing the method described in the Bray patent. When laminating a thin film at high temperature with a slow speed, a porous backing resulted and other processing problems arose. These included continuous build up of polymer that melted and flowed through the cloth openings and onto the cast roll. The porous cloth laminate had a rough surface due to the polymer flowing through the cloth and attaching to the cast roll. Both of these were unacceptable from a process and from a product view point.

Comparative Example 12

This Comparative Example shows that saturating, impregnating or solvent-coating the polymer onto the woven cloth does not result in the tape backing of the invention.

Woven cloth having a weave density of 44×36 threads per 2.5 cm was coated using a 15.2 cm wide knife spreader at a 125 micron gap and at a 500 micron gap with Kraton 1107 in toluene at 30% solids. FIGS. 2 and 3 show the sample resulting from coating the cloth with a 125 micron gap. The fibers of the cloth were encapsulated with the polymer, therefore, the resultant sample did not have the feel of cloth. However, both the 125 micron and 500 micron coated cloth had acceptable tear properties between 4 and 5 on a scale of 1 to 5 where 5 is good and 1 is poor. Porosity testing was done on both samples in 3.4 seconds the 125 micron sample passed 10 cc of air and in 85 seconds and the 500 micron sample passed 10 cc of air.

Backings prepared according to this comparative example are not acceptable because they lack the feel of cloth.

We claim:

1. An adhesive tape comprising:

a substrate comprised of regularly spaced fibers in the down-web and cross-web directions wherein said fibers are not woven, a polymer coated and embedded into said substrate such that the warp and weft fibers are securely bonded at their overlap points but said fibers are not completely encased with said polymer, and a pressure sensitive adhesive coated onto at least a portion of said polymer, wherein the adhesive tape is hand tearable in the down-web and in the cross-web direction.

2. The adhesive tape of claim 1 wherein said polymer is thermoplastic.

3. The adhesive tape of claim 1 wherein said polymer is elastomeric.

4. The adhesive tape of claim 1 wherein said polymer is selected from the group consisting of polyethylene elastomer, copolymers of polyethylene, blends of polyethylene and polyethylene copolymer, ethylene vinyl acetate polyurethane, block copolymers, polyether block amides, acrylonitrile butadiene styrene copolymer, polyester block copolymers, polypropylene, polycarbonate, polyacrylics, nylon and blends thereof.

5. The adhesive tape of claim 1 wherein the polymer is comprised of a polyethylene-based polymer and the adhesive is comprised of a blend of an acrylic and a thermoplastic elastomer and the unwind tension of a roll of tape is less than 14 N/dm without using a low adhesion backsize.

6. The adhesive tape of claim 1 wherein the torn edges of the tape do not curl.

7. The adhesive tape of claim 1 wherein said adhesive is selected from the group consisting of acrylics, synthetic rubbers, natural rubbers, silicones and block copolymers.

8. The adhesive tape of claim 1 wherein said adhesive is comprised of a blend of an acrylic pressure-sensitive adhesive and a thermoplastic elastomer, said composition comprising at least 5 weight percent adhesive and said composition having a morphology comprising at least two distinct domains, a first domain being substantially continuous in nature and said second domain being fibrillose to schistose in nature parallel to the major surface of the adhesive within said first domain.

9. The adhesive tape of claim 1 wherein said adhesive is comprised of a blend of an acrylic pressure-sensitive adhesive and an elastomer and a tackifier, said composition comprising at least 5 weight percent adhesive and said composition having a morphology comprising at least two distinct domains, a first domain being substantially continuous in nature and said second domain being fibrillose to schistose in nature parallel to the major surface of the adhesive within said first domain.

10. The adhesive tape of claim 1 wherein said polymer is comprised of at least two layers.

11. The adhesive tape of claim 1 wherein said polymer is comprised of at least two different polymers.

12. The adhesive tape of claim 1 wherein said polymer is between about 12 and about 150 micrometers thick.

13. The adhesive tape of claim 1 wherein said polymer is between about 25 and about 75 micrometers thick.

14. The adhesive tape of claim 1 wherein said polymer is extruded onto said substrate.

15. A composite backing, comprising:

a woven or nonwoven substrate cloth comprised of fibers oriented in a down-web and a cross-web direction, and having a first side and a second side, a polymer on said second side of said substrate cloth and said polymer embedded into said cloth such that the overlapping fibers of said substrate cloth are bound together but said polymer does not extend through to said first side of said cloth, and wherein said resulting composite backing is hand tearable along a substantially straight line in a down-web and in a cross-web direction without fraying.

16. The composite backing of claim 15 wherein said polymer is extrusion coated onto said cloth.

17. The composite backing of claim 15 wherein said polymer is selected from the group consisting of polyethylene elastomer, copolymers of polyethylene, blends of polyethylene and polyethylene copolymer, ethylene vinyl acetate, polyurethane, block copolymers, polyether block amides, acrylonitrile butadiene styrene copolymer, polyester block copolymers, polypropylene, polycarbonate, polyacrylics, nylon and blends thereof.

18. The composite backing of claim 15 wherein said backing has a cloth feel on said uncoated side.

19. The composite backing of claim 15 wherein the torn edges of the backing do not curl.

20. The composite backing of claim 15 wherein said polymer is comprised of at least two layers.

21. The composite backing of claim 20 wherein said polymer is comprised of at least two different polymers.

22. The adhesive tape of claim 15 wherein said polymer is between about 12 and about 150 micrometers thick.

23. The adhesive tape of claim 15 wherein said polymer is between about 18 and about 50 micrometers thick.

24. An adhesive article useful for medical applications, comprising:
- a woven or nonwoven substrate comprised of fibers oriented in a down-web and a cross-web direction, and
- a polymer embedded into said substrate to cause the fibers of said substrate to bond without completely encasing the fibers, and
- a pressure sensitive adhesive having a $T_0$ of at least 1 N/dm and a $T_{48}$ of less than 12 N/dm when adhered to skin as defined by the Skin Adhesion Test as defined herein and wherein said article is hand tearable in a substantially straight line without fraying.

25. The adhesive article of claim 24 wherein the substrate is comprised of a woven cloth.

26. The adhesive article of claim 24 wherein said adhesive is comprised of a blend of at least two components comprised of about 5 to about 95% by weight of a first component comprised of at least one acrylic pressure sensitive adhesive and about 5 to about 95% by weight of a second component comprised of either (a) at least one elastomer with a tackifying resin, or (b) at least one thermoplastic elastomer.

* * * * *

UNITED STATES PATENT AND TRADEMARK OFFICE
CERTIFICATE OF CORRECTION

PATENT NO.: 6,048,806

DATED: April 11, 2000

INVENTOR(S): Gerald S. Deeb, Dennis L. Krueger, Robert H. Menzies, Herbert W. Morris, Patrick D. Hyde, Felix P. Lau, Eumi Pyun, Pamela S. Tucker, Roy Wong.

It is certified that error appears in the above-identified patent and that said Letters Patent is hereby corrected as shown below :

Col. 44, Claim 22 should read:
-- The [adhesive tape] composite backing of claim 15--

Col. 44, Claim 23 should read:
-- The [adhesive tape] composite backing of claim 15 --

Signed and Sealed this

Twentieth Day of March, 2001

Attest:

NICHOLAS P. GODICI

Attesting Officer      Acting Director of the United States Patent and Trademark Office